(12) United States Patent
Okuma

(10) Patent No.: US 12,539,559 B2
(45) Date of Patent: Feb. 3, 2026

(54) LASER PROCESSING DEVICE

(71) Applicant: HAMAMATSU PHOTONICS K.K., Hamamatsu (JP)

(72) Inventor: Junji Okuma, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 234 days.

(21) Appl. No.: 18/138,955

(22) Filed: Apr. 25, 2023

(65) Prior Publication Data
US 2023/0256535 A1    Aug. 17, 2023

Related U.S. Application Data

(63) Continuation of application No. 16/632,707, filed as application No. PCT/JP2018/027499 on Jul. 23, 2018, now abandoned.

(30) Foreign Application Priority Data

Jul. 25, 2017    (JP) ................................. 2017-143627

(51) Int. Cl.
*B23K 26/064* (2014.01)
*B23K 26/03* (2006.01)
(Continued)

(52) U.S. Cl.
CPC .......... *B23K 26/064* (2015.10); *B23K 26/032* (2013.01); *B23K 26/042* (2015.10);
(Continued)

(58) Field of Classification Search
CPC .. B23K 26/064; B23K 26/042; B23K 26/359; B23K 26/702; B23K 26/705;
(Continued)

(56) References Cited

U.S. PATENT DOCUMENTS 6,091,488 A * 7/2000 Bishop ................. G01N 21/956
356/237.5
6,563,130 B2 * 5/2003 Dworkowski .......... G01S 17/46
702/158
(Continued)

FOREIGN PATENT DOCUMENTS

CN            1720117 A      1/2006
CN          101291770 A     10/2008
(Continued)

OTHER PUBLICATIONS

International Preliminary Report on Patentability mailed Feb. 6, 2020 for PCT/JP2018/027499.

*Primary Examiner* — Jimmy Chou
(74) *Attorney, Agent, or Firm* — Faegre Drinker Biddle & Reath LLP

(57) ABSTRACT

A laser processing device includes a support unit, a laser light source, a reflecting spatial light modulator, a light collection optical system, an imaging optical system, a mirror, a first sensor configured to acquire displacement data on a laser light entry surface, and a second sensor configured to acquire displacement data on the laser light entry surface. An optical path of the laser light extending from the mirror to the light collection optical system is set along a first direction. An optical path of the laser light extending from the reflecting spatial light modulator to the mirror through the imaging optical system is set along a second direction. The first sensor is disposed on one side of the light collection optical system in a third direction.

7 Claims, 18 Drawing Sheets

(51) Int. Cl.
*B23K 26/042* (2014.01)
*B23K 26/06* (2014.01)
*B23K 26/08* (2014.01)
*B23K 26/359* (2014.01)
*B23K 26/70* (2014.01)
*B23K 103/00* (2006.01)

(52) U.S. Cl.
CPC ...... *B23K 26/0665* (2013.01); *B23K 26/0853* (2013.01); *B23K 26/359* (2015.10); *B23K 26/702* (2015.10); *B23K 26/705* (2015.10); *B23K 2103/56* (2018.08)

(58) Field of Classification Search
CPC .............. B23K 26/032; B23K 26/0665; B23K 26/0853; B23K 2103/56
USPC .......................................................... 423/135
See application file for complete search history.

(56) References Cited

U.S. PATENT DOCUMENTS

| | | | | |
|---|---|---|---|---|
| 6,700,658 | B2* | 3/2004 | Leonard | G01N 21/95684 |
| | | | | 356/237.1 |
| 7,638,731 | B2* | 12/2009 | Kosmowski | B23K 26/043 |
| | | | | 219/121.68 |
| 8,624,153 | B2* | 1/2014 | Atsumi | B23K 26/53 |
| | | | | 219/121.72 |
| 8,987,634 | B2* | 3/2015 | Pieger | B23K 31/12 |
| | | | | 219/121.84 |
| 8,993,922 | B2* | 3/2015 | Atsumi | B23K 26/046 |
| | | | | 219/121.67 |
| 9,895,769 | B2* | 2/2018 | Tokito | B23K 26/048 |
| 11,148,231 | B2* | 10/2021 | Ortner | B23K 26/0884 |
| 2003/0178398 | A1* | 9/2003 | Nagatoshi | B23K 26/04 |
| | | | | 219/121.81 |
| 2007/0084837 | A1* | 4/2007 | Kosmowski | B23K 26/043 |
| | | | | 219/121.68 |
| 2010/0133243 | A1* | 6/2010 | Nomaru | B23K 26/032 |
| | | | | 219/121.67 |
| 2013/0256285 | A1* | 10/2013 | Baxter | B23K 26/048 |
| | | | | 219/121.72 |
| 2014/0001679 | A1* | 1/2014 | Okuma | H01L 21/78 |
| | | | | 264/400 |
| 2014/0116997 | A1* | 5/2014 | Inoue | B23K 26/38 |
| | | | | 219/121.67 |
| 2014/0312010 | A1* | 10/2014 | Phillip | B23K 7/00 |
| | | | | 266/77 |
| 2016/0052083 | A1* | 2/2016 | Kawaguchi | C03B 33/0222 |
| | | | | 219/121.75 |
| 2016/0059351 | A1* | 3/2016 | Miyashita | B23K 26/048 |
| | | | | 219/121.81 |
| 2016/0144553 | A1* | 5/2016 | Kobayashi | G05B 19/182 |
| | | | | 425/150 |
| 2016/0184923 | A1* | 6/2016 | Tokito | B23K 26/048 |
| | | | | 219/121.81 |
| 2017/0113301 | A1* | 4/2017 | Sakamoto | B23K 26/0676 |
| 2017/0236738 | A1* | 8/2017 | Van Lieshout | B23K 26/364 |
| | | | | 425/174 |
| 2018/0076060 | A1* | 3/2018 | Oh | H01L 21/68757 |
| 2020/0209523 | A1* | 7/2020 | Nehashi | G01B 11/026 |
| 2021/0010803 | A1* | 1/2021 | Okuma | G01B 11/026 |

FOREIGN PATENT DOCUMENTS

| | | |
|---|---|---|
| CN | 102227667 A | 10/2011 |
| CN | 103920990 A | 7/2014 |
| CN | 203918227 U | 11/2014 |
| CN | 105008085 A | 10/2015 |
| CN | 103008888 B | 1/2016 |
| CN | 105945422 A | 9/2016 |
| CN | 106463374 A | 2/2017 |
| JP | S62-021486 A | 1/1987 |
| JP | 3878758 B2 | 2/2007 |
| JP | 2010-000542 A | 1/2010 |
| JP | 2010-155258 A | 7/2010 |
| JP | 5456510 B2 | 4/2014 |
| JP | 2017-013092 A | 1/2017 |
| TW | 201315554 A | 4/2013 |
| TW | 201323124 A | 6/2013 |
| WO | WO 2013/039162 A1 | 3/2013 |

* cited by examiner (a)

(b)

LASER PROCESSING DEVICE

TECHNICAL FIELD

One aspect of the present invention relates to a laser processing device.

BACKGROUND ART

Patent Literature 1 discloses a laser processing device including a holding mechanism that holds a workpiece and a laser irradiation mechanism that irradiates the workpiece held by the holding mechanism with laser light. In this laser processing device, components arranged on an optical path of the laser light extending from a laser oscillator to a condenser lens are accommodated in one housing. The housing is fixed to a wall portion standing erect on a base of the laser processing device.

CITATION LIST

Patent Literature

Patent Literature 1: Japanese Patent No. 5456510

SUMMARY OF INVENTION

Technical Problem

Such a laser processing device may include a sensor that irradiates an object to be processed with ranging laser light and receives reflected light of the ranging laser light to acquire displacement data on a laser light entry surface of the object. In such a case, it is desired that the displacement data can be accurately acquired in accordance with to various requirements. Even in such a case, it is important to suppress an increase in device size.

An object of one aspect of the present invention is to provide a laser processing device capable of accurately acquiring displacement data on a laser light entry surface of an object to be processed in accordance with various requirements while suppressing an increase in device size.

Solution to Problem

A laser processing device according to one aspect of the present invention includes a support unit configured to support an object to be processed, a laser light source configured to emit laser light, a reflecting spatial light modulator configured to modulate and reflect the laser light, a light collection optical system configured to converge the laser light at the object, an imaging optical system constituting a both-side telecentric optical system in which a reflecting surface of the reflecting spatial light modulator and an entrance pupil surface of the light collection optical system have an imaging relation, a mirror configured to reflect, toward the light collection optical system, the laser light passing through the imaging optical system, a first sensor configured to irradiate the object with first ranging laser light different in axis from the laser light without through the light collection optical system and receive reflected light of the first ranging laser light to acquire displacement data on a laser light entry surface of the object, and a second sensor configured to irradiate the object with second ranging laser light coaxial with the laser light through the light collection optical system and receive reflected light of the second ranging laser light to acquire displacement data on the laser light entry surface. In such a laser processing device, an optical path of the laser light extending from the mirror to the light collection optical system is set along a first direction, an optical path of the laser light extending from the reflecting spatial light modulator to the mirror through the imaging optical system is set along a second direction orthogonal to the first direction, and the first sensor is disposed on one side of the light collection optical system in a third direction orthogonal to the first direction and the second direction.

This laser processing device includes, as sensors that acquire the displacement data on the laser light entry surface of the object (hereinafter, simply referred to as "laser light entry surface"), both the first sensor that makes irradiation with the first ranging laser light different in axis from the laser light L without through the light collection optical system and the second sensor that makes irradiation with the second ranging laser light coaxial with the laser light through the light collection optical system. The first sensor and the second sensor have different advantages, and thus the use of the best of both the advantages as needed makes it possible to accurately acquire the displacement data in accordance with various requirements. Further, the first sensor is disposed on one side of a plane on which the optical path of the laser light extends from the reflecting spatial light modulator to the light collection optical system. That is, the first sensor is efficiently disposed for each component arranged on the optical path of the laser light L extending from the reflecting spatial light modulator to the light collection optical system. Therefore, the laser processing device according to one aspect of the present invention is capable of accurately acquire the displacement data on the laser light entry surface of the object in accordance with various requirements while suppressing an increase in device size.

The laser processing device according one aspect of the present invention may further include a housing configured to support at least the reflecting spatial light modulator, the light collection optical system, the imaging optical system, the mirror, and the first sensor, and a transfer mechanism configured to move the housing in the first direction. In such a laser processing device, the light collection optical system and the first sensor may be attached to one end of the housing in the second direction, and the transfer mechanism may be attached to one side surface of the housing in the third direction. This configuration allows the reflecting spatial light modulator, the light collection optical system, the imaging optical system, the mirror, and the first sensor to move together while suppressing an increase in device size.

In the laser processing device according one aspect of the present invention, a plurality of the first sensors may be provided, one of the plurality of first sensors may be disposed on the one side of the light collection optical system in the third direction, and the other of the plurality of first sensors may be disposed on the other side of the light collection optical system in the third direction. This configuration allows the plurality of first sensors to be efficiently arranged for each of the components arranged on the optical path of the laser light L extending from the reflecting spatial light modulator to the light collection optical system.

The laser processing device according one aspect of the present invention includes a laser light source configured to emit laser light, a spatial light modulator configured to modulate the laser light, a light collection optical system configured to converge the laser light at an object to be processed, a first sensor configured to irradiate the object with first ranging laser light different in axis from the laser light without through the light collection optical system and receive reflected light of the first ranging laser light to acquire displacement data on a laser light entry surface of the object, and a second sensor configured to irradiate the object with second ranging laser light coaxial with the laser light through the light collection optical system and receive reflected light of the second ranging laser light to acquire displacement data on the laser light entry surface.

According to the laser processing device, the first sensor and the second sensor have different advantages, and thus the use of the best of both the advantages as needed makes it possible to accurately acquire the displacement data in accordance with various requirements.

The laser processing device according to one aspect of the present invention may further include a drive mechanism configured to move the light collection optical system along an optical axis, and a controller configured to control drive for the drive mechanism. In such a laser processing device, the controller may drive the drive mechanism based on at least one of the displacement data acquired by the first sensor and the displacement data acquired by the second sensor to cause the light collection optical system to follow the laser light entry surface. This configuration makes it possible to move the light collection optical system based on at least one of the displacement data acquired by the first sensor and the displacement data acquired by the second sensor with a distance between the laser light entry surface and a concentration point of the laser light kept constant, for example.

Advantageous Effects of Invention

According to one aspect of the present invention, it is possible to provide the laser processing device capable of accurately acquire the displacement data on the laser light entry surface of the object in accordance with various requirements while suppressing an increase in device size.

DESCRIPTION OF EMBODIMENTS

Figure 1:
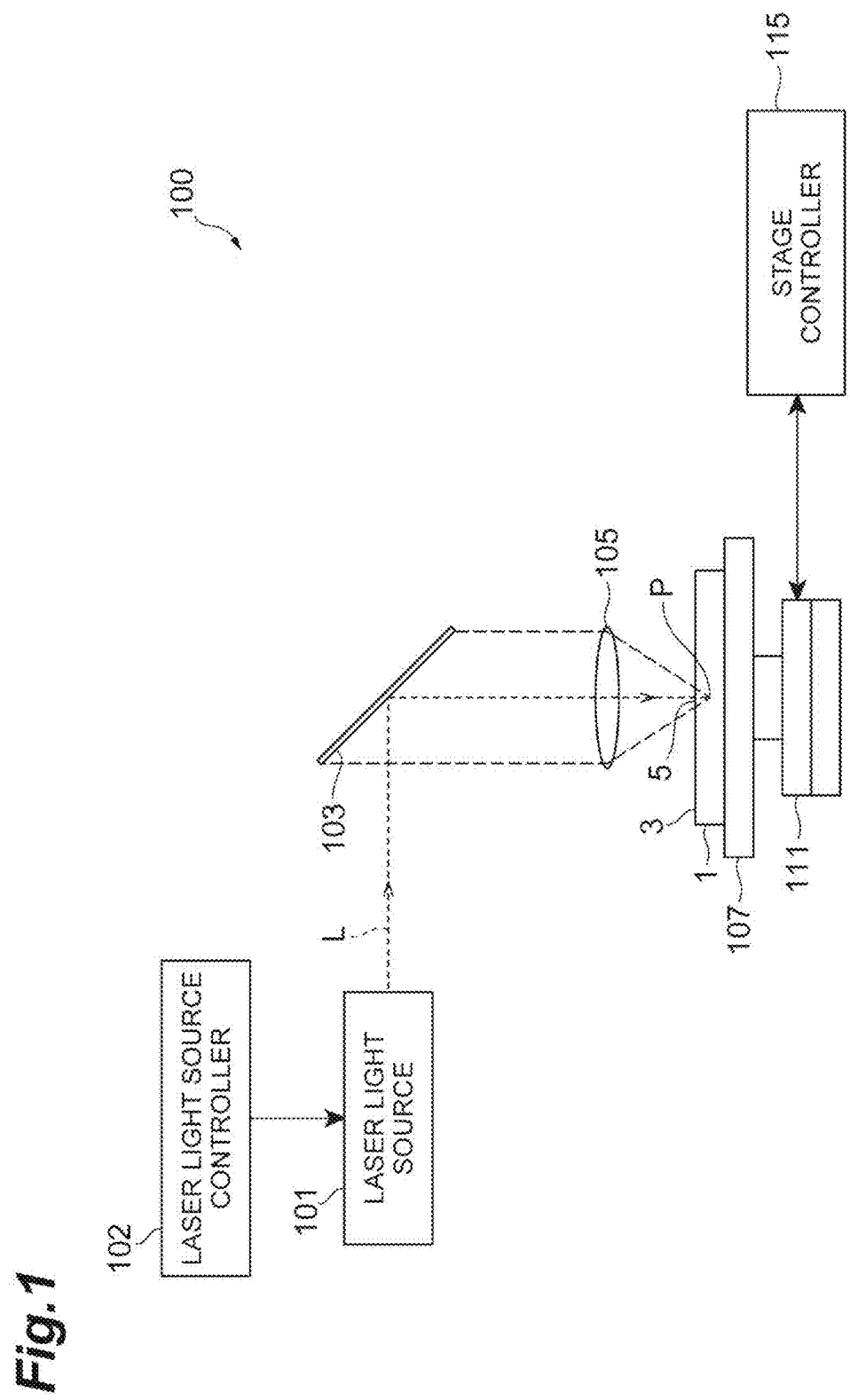
FIG. 1 is a schematic block diagram of a laser processing device to be used for formation of a modified region.

Hereinafter, a description will be given in detail of an embodiment with reference to the drawings. Note that, in each of the drawings, the same or equivalent components are denoted by the same reference numerals, and no redundant description will be given.

A laser processing device (to be described later) according to the embodiment converges laser light at an object to be processed to form a modified region along a to-be-cut line. First, a description will be given of the formation of the modified region with reference to FIG. 1 to FIG. 6.

As shown in FIG. 1, a laser processing device 100 includes a laser light source 101 that emits pulsed laser light L, a dichroic mirror 103 that is set so as to change a direction of an optical axis (optical path) of the laser light L by 90°, and a condenser lens 105 that converges the laser light L. The laser processing device 100 further includes a support table 107 used for supporting an object to be processed 1 irradiated with the laser light L converged by the condenser lens 105, a stage 111 used for moving the support table 107, a laser light source controller 102 that controls the laser light source 101 to adjust output, pulse width, pulse waveform, and the like of the laser light L, and a stage controller 115 that controls movement of the stage 111.

In the laser processing device 100, the laser light L emitted from the laser light source 101 is changed, by the dichroic mirror 103, in direction of its optical axis by 90° and is converged, by the condenser lens 105, into the object 1 placed on the support table 107. At the same time, the stage 111 is moved to cause the object 1 to move relative to the laser light L along the to-be-cut line 5. As a result, the modified region along the to-be-cut line 5 is formed in the object 1. Note that, herein, the stage 111 is moved to cause the laser light L to relatively move, but the condenser lens 105 may be moved, or both the stage 111 and the condenser lens 105 may be moved.

Figure 2:
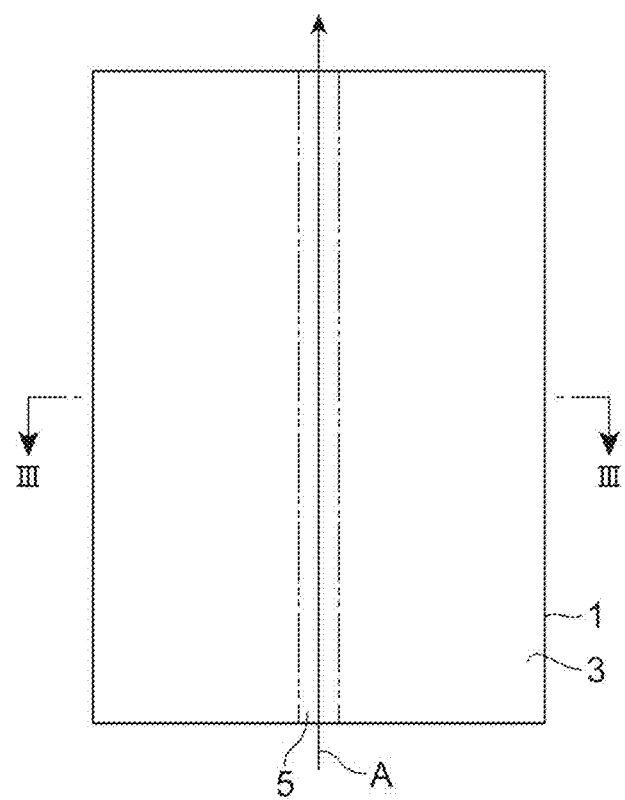
FIG. 2 is a plan view of an object to be processed in which the modified region is to be formed.
Figure 3:
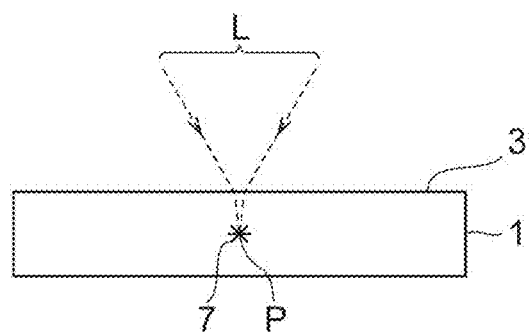
FIG. 3 is a cross-sectional view taken along line of the object shown in FIG. 2.
Figure 4:
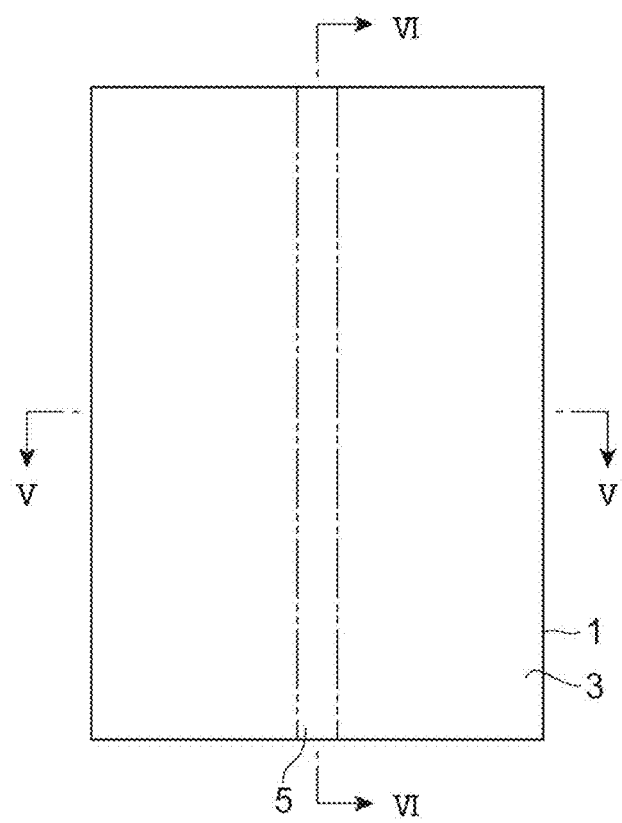
FIG. 4 is a plan view of the object that has undergone laser processing.
Figure 5:
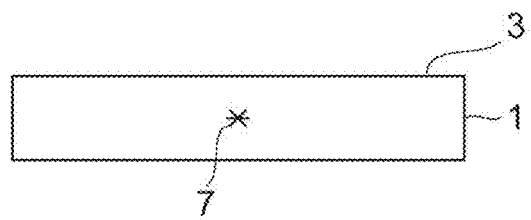
FIG. 5 is a cross-sectional view taken along line V-V of the object shown in FIG. 4.
Figure 6:
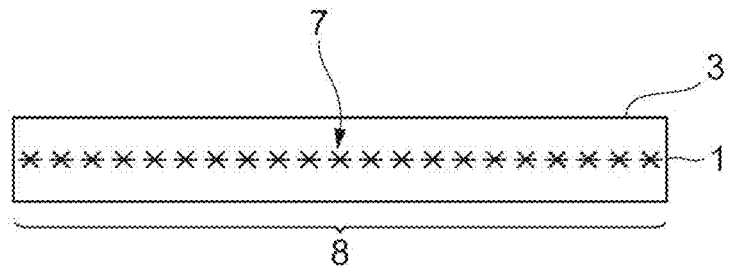
FIG. 6 is a cross-sectional view taken along line VI-VI of the object shown in FIG. 4.

As the object 1, a plate member (such as a substrate or a wafer) such as a semiconductor substrate made of a semiconductor material, a piezoelectric substrate made of a piezoelectric material, or the like is used. As shown in FIG. 2, the to-be-cut line 5 along which the object 1 is cut is set on the object 1. The to-be-cut line 5 is a virtual line linearly extending. In order to form the modified region inside the object 1, as shown in FIG. 3, the laser light L is relatively moved along the to-be-cut line 5 (that is, in the direction of arrow A shown in FIG. 2) with a concentration point (concentration position) P positioned inside the object 1. As a result, as shown in FIG. 4, FIG. 5, and FIG. 6, a modified region 7 is formed in the object 1 along the to-be-cut line 5, and the modified region 7 formed along the to-be-cut line 5 serves as a cutting start region 8.

The concentration point P is a position where the laser light L is converged. The to-be-cut line 5 is not limited to a straight line but may be a curved line or a three-dimensional line formed of a combination of a straight line and a curved line, or may be represented by designated coordinates. The to-be-cut line 5 is not limited to a virtual line but may be a line actually drawn on a front surface 3 of the object 1. The modified region 7 may be formed continuously or intermittently. The modified region 7 may be a line or dots, that is, the modified region 7 only needs to be formed at least inside the object 1. Further, a crack may be formed extending from the modified region 7, and the crack and the modified region 7 may be exposed on an outer surface (the front surface 3, a back surface, or an outer peripheral surface) of the object 1. A laser light entry surface for the formation of the modified region 7 is not limited to the front surface 3 of the object 1 but may be the back surface of the object 1.

Note that, when the modified region 7 is formed inside the object 1, the laser light L is largely absorbed near the concentration point P located inside the object 1 while passing through the object 1. As a result, the modified region 7 is formed in the object 1 (that is, internal absorption laser processing). In this case, the laser light L is hardly absorbed by the front surface 3 of the object 1, preventing the front surface 3 of the object 1 from being melted. On the other hand, when the modified region 7 is formed on the front surface 3 of the object 1, the laser light L is largely absorbed near the concentration point P located on the front surface 3 to melt and remove the front surface 3, thereby forming a removed portion such as a hole or a groove (surface absorption laser processing).

The modified region 7 is a region different from its surroundings in density, refractive index, mechanical strength, and other physical properties. Examples of the modified region 7 include a melting treatment region (corresponding to at least one of a region that is once melted and then solidified, a molten region, and a region in transition from a molten state to a solid state), a crack region, a dielectric breakdown region, a refractive index change region, and the like, and further include a region where these regions coexists. The examples of the modified region 7 further include a region where the modified region 7 changes in density of a material of the object 1 compared to a non-modified region, and a region where lattice defects are formed. When the material of the object 1 is monocrystalline silicon, it can be said that the modified region 7 is a high dislocation density region.

The melting treatment region, the refractive index change region, the region where the modified region 7 changes in density compared to a non-modified region, and the region where lattice defects are formed may each contain a crack (a fracture, a microcrack) inside the region or at an interface between the modified region 7 and the non-modified region. The crack thus contained may be formed all or partially over the modified region 7, or may be formed over a plurality of sections. the object 1 includes a substrate made of a crystalline material having a crystalline structure. For example, v 1 includes a substrate made of at least one of gallium nitride (GaN), silicon (Si), silicon carbide (SiC), $LiTaO_3$, and sapphire ($Al_2O_3$). In other words, the object 1 includes, for example, a gallium nitride substrate, a silicon substrate, a SiC substrate, a $LiTaO_3$ substrate, or a sapphire substrate.

The crystalline material may be either an anisotropic crystal or an isotropic crystal. Further, the object 1 may include a substrate made of a non-crystalline material having a non-crystalline structure (amorphous structure), such as a glass substrate.

According to the embodiment, the modified region 7 can be formed of a plurality of modified spots (processing traces) formed along the to-be-cut line 5. In this case, the plurality of modified spots are gathered together to form the modified region 7. Each of the modified spots is a modified portion formed by one shot of pulsed laser light (that is, one pulse of laser irradiation: laser shot). Examples of the modified spot include a crack spot, a melting treatment spot, a refractive index change spot, or a mixture of at least one of thereof. For the modified spot, while taking into consideration required cutting accuracy, required flatness of a cut surface, a thickness, type, crystalline orientation, and the like of the object 1, a size of the modified spot and a length of a crack to be generated are suitably controlled. Further, according to the embodiment, the modified spot can be formed as the modified region 7 along the to-be-cut line 5.

[Laser Processing Device According to Embodiment]

Next, a description will be given of the laser processing device according to the embodiment. In the following description, directions orthogonal to each other in a horizontal plane are defined as an X-axis direction and a Y-axis direction, and a vertical direction is defined as a Z-axis direction.

[Overall Structure of Laser Processing Device]

Figure 7:
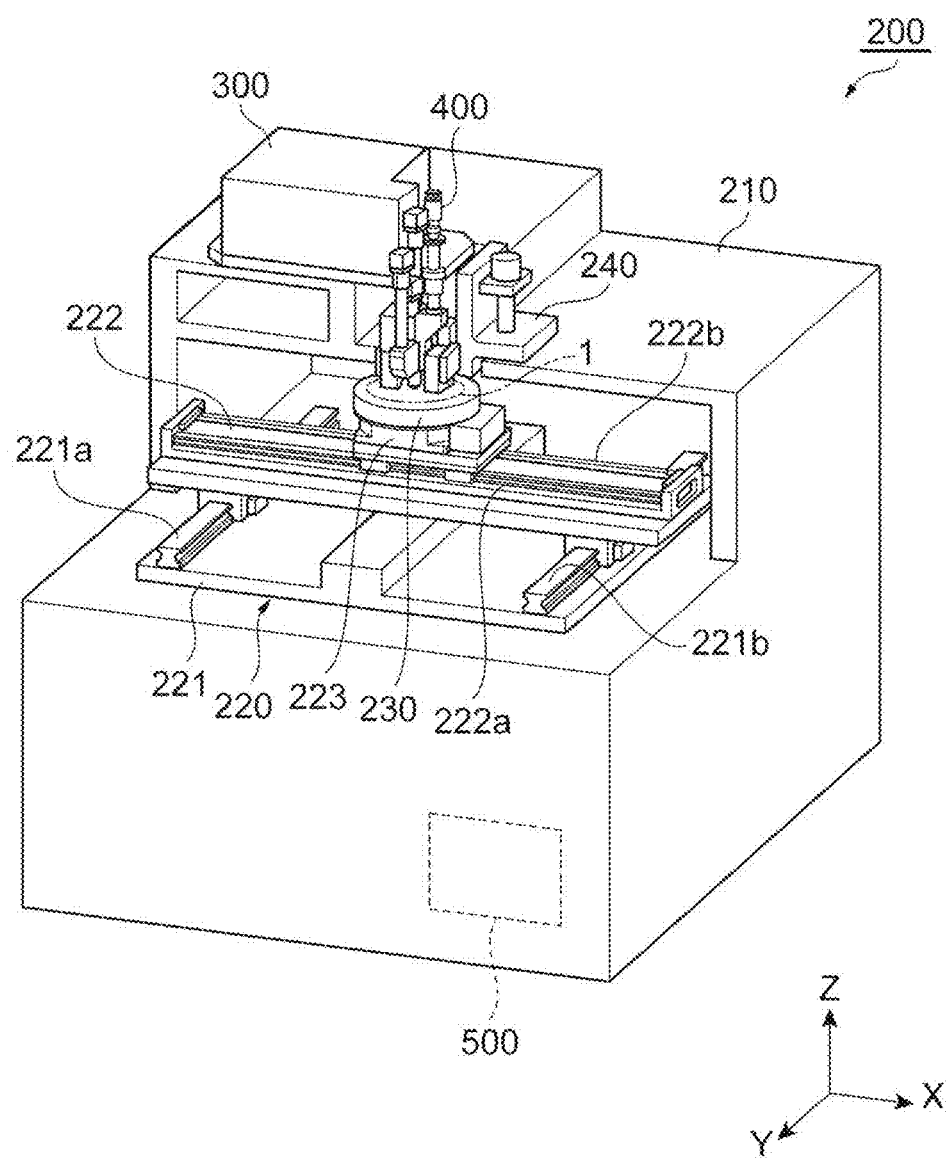
FIG. 7 is a perspective view of the laser processing device according to an embodiment.

As shown in FIG. 7, the laser processing device 200 includes a device frame 210, a first transfer mechanism 220, a support table (support unit) 230, and a second transfer mechanism (transfer mechanism) 240. The laser processing device 200 further includes a laser output unit 300, a laser condensing unit 400, and a controller 500.

The first transfer mechanism 220 is attached to the device frame 210. The first transfer mechanism 220 includes a first rail unit 221, a second rail unit 222, and a movable base 223. The first rail unit 221 is attached to the device frame 210. The first rail unit 221 includes a pair of rails 221a, 221b extending in the Y-axis direction. The second rail unit 222 is attached to the pair of rails 221a, 221b of the first rail unit 221 to be movable in the Y-axis direction. The second rail unit 222 includes a pair of rails 222a, 222b extending in the X-axis direction. The movable base 223 is attached to the pair of rails 222a, 222b of the second rail unit 222 to be movable in the X-axis direction. The movable base 223 is rotatable about an axis parallel to the Z-axis direction.

Figure 8:
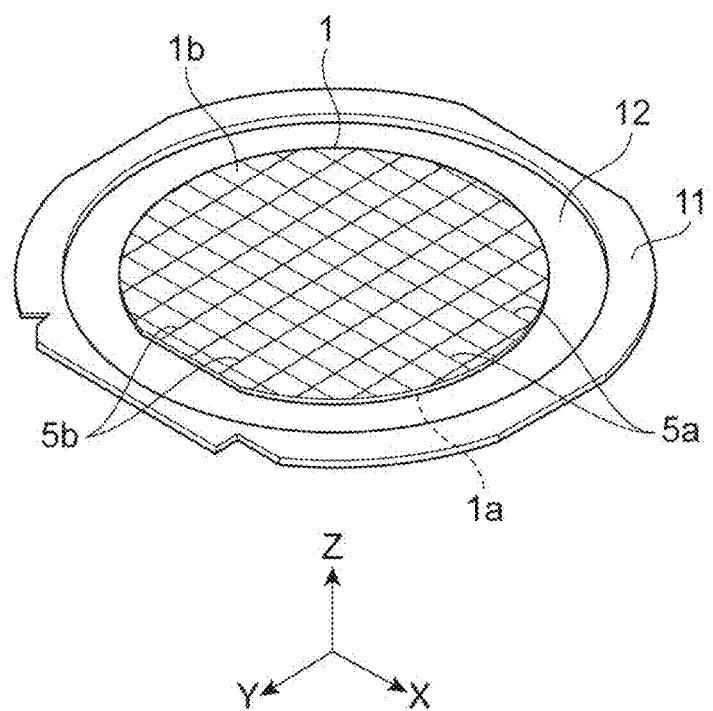
FIG. 8 is a perspective view of the object that has been set on a support table of the laser processing device shown in FIG. 7.

The support table 230 is attached to the movable base 223. The support table 230 supports the object 1. the object 1 is, for example, a substrate made of a semiconductor material such as silicon that has a plurality of functional elements (a light receiving element such as a photodiode, a light emitting element such as a laser diode, and a circuit element formed as a circuit) formed in a matrix on a front surface thereof. When the object 1 is supported on the support table 230, as shown in FIG. 8, a front surface 1a of the object 1 (where the plurality of functional elements are present) is stuck onto a film 12 stretched over an annular frame 11, for example. The support table 230 supports the object 1 by holding the frame 11 with a clamp and sucking the film 12 with a vacuum chuck table. On the support table 230, a plurality of to-be-cut lines 5a parallel to each other and a plurality of to-be-cut lines 5b parallel to each other are set in a grid pattern on the object 1 so as to pass through between adjacent functional elements.

As shown in FIG. 7, the first transfer mechanism 220 brings the second rail unit 222 into operation to move the support table 230 in the Y-axis direction. Further, the first transfer mechanism 220 brings the movable base 223 into operation to move the support table 230 in the X-axis direction. Further, the first transfer mechanism 220 brings the movable base 223 into operation to rotate the support table 230 about the axis parallel to the Z-axis direction. As described above, the support table 230 is attached to the device frame 210 to be movable in the X-axis direction and the Y-axis direction and rotatable about the axis parallel to the Z-axis direction.

The laser output unit 300 is attached to the device frame 210. The laser condensing unit 400 is attached to the device frame 210 with the second transfer mechanism 240 interposed between the laser condensing unit 400 and the device frame 210. The second transfer mechanism 240 is brought into operation to move the laser condensing unit 400 in the Z-axis direction. As described above, the laser condensing unit 400 is attached to the device frame 210 to be movable in the Z-axis direction relative to the laser output unit 300.

The controller 500 includes a central processing unit (CPU), a read only memory (ROM), a random access memory (RAM), and the like. The controller 500 controls each component of the laser processing device 200.

As an example, in the laser processing device 200, the modified region is formed inside the object 1 along each of the to-be-cut lines 5a, 5b (see FIG. 8) as described below.

First, the object 1 is supported on the support table 230 such that a back surface 1b (see FIG. 8) of the object 1 serves as a laser light entry surface, and each of the to-be-cut lines 5a on the object 1 is made parallel to the X-axis direction. Subsequently, the second transfer mechanism 240 moves the laser condensing unit 400 to set the concentration point of the laser light L at a position that is inside the object 1 and away from the laser light entry surface of the object 1 by a predetermined distance. Subsequently, with the distance between the laser light entry surface of the object 1 and the concentration point of the laser light L kept constant, the concentration point of the laser light L is relatively moved along each of the to-be-cut lines 5a. As a result, the modified region is formed inside the object 1 along each of the to-be-cut lines 5a. The laser light entry surface is not limited to the back surface 1b, and may be the front surface 1a.

When the formation of the modified region along each of the to-be-cut lines 5a is completed, the first transfer mechanism 220 rotates the support table 230 to make each of the to-be-cut lines 5b on the object 1 parallel to the X-axis direction. Subsequently, the second transfer mechanism 240 moves the laser condensing unit 400 to set the concentration point of the laser light L at a position that is inside the object 1 and away from the laser light entry surface of the object 1 by a predetermined distance. Subsequently, with the distance between the concentration point of the laser light L and the laser light entry surface of the object 1 kept constant, the concentration point of the laser light L is relatively moved along each of the to-be-cut lines 5b. As a result, the modified region is formed inside the object 1 along each of the to-be-cut lines 5b.

As described above, in the laser processing device 200, the direction parallel to the X-axis direction serves as a processing direction (scan direction of the laser light L). Note that the first transfer mechanism 220 moves the support table 230 in the X-axis direction to make the relative movement of the concentration point of the laser light L along each of the to-be-cut lines 5a and the relative movement of the concentration point of the laser light L along each of the to-be-cut lines 5b. Further, the first transfer mechanism 220 moves the support table 230 in the Y-axis direction to make the relative movement of the concentration point of the laser light L between the to-be-cut lines 5a and the relative movement of the concentration point of the laser light L between the to-be-cut lines 5b.

Figure 9:
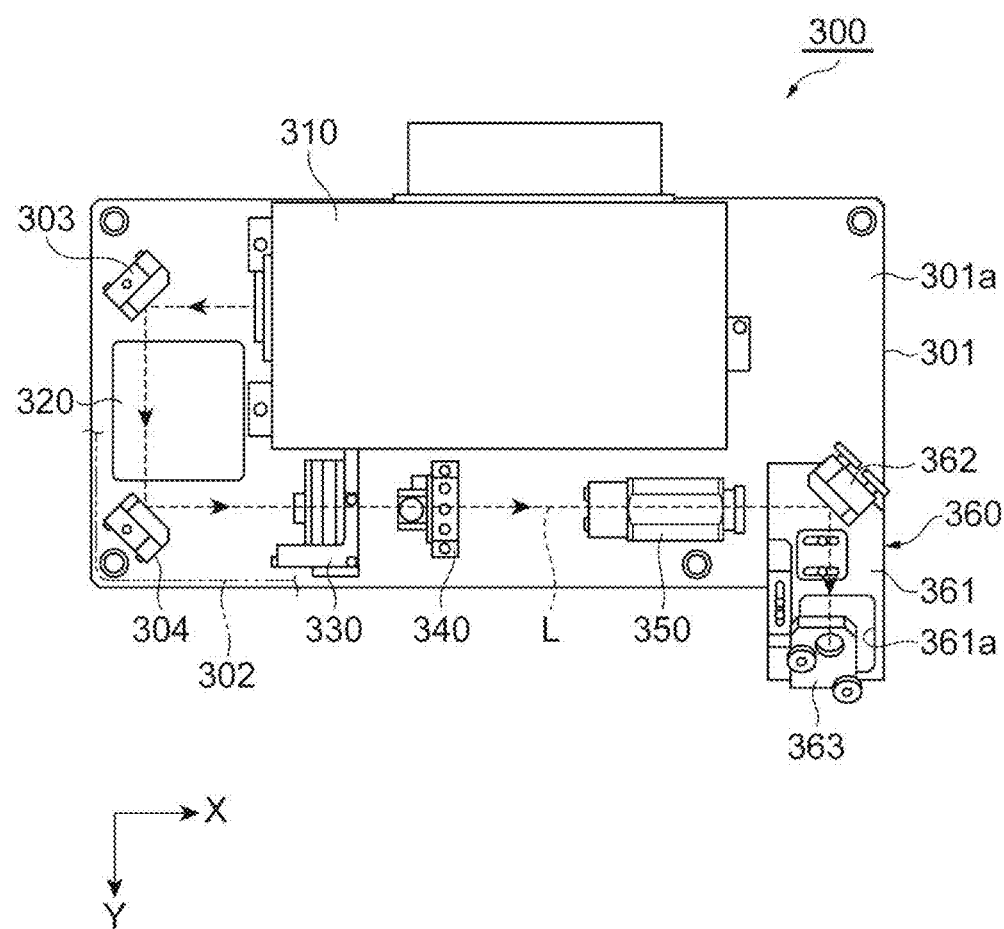
FIG. 9 is a cross-sectional view of a laser output unit, taken along a ZX plane of FIG. 7.

As shown in FIG. 9, the laser output unit 300 includes an attachment base 301, a cover 302, and a plurality of mirrors 303, 304. The laser output unit 300 further includes a laser oscillator (laser light source) 310, a shutter 320, a $\lambda/2$ wavelength plate unit (output adjustment unit, polarization direction adjustment unit) 330, and a polarizing plate unit (output adjustment unit, polarization direction adjustment unit) 340, a beam expander (laser light collimating unit) 350, and a mirror unit 360.

The attachment base 301 supports the plurality of mirrors 303, 304, the laser oscillator 310, the shutter 320, the $\lambda/2$ wavelength plate unit 330, the polarizing plate unit 340, the beam expander 350, and the mirror unit 360. The plurality of mirrors 303, 304, the laser oscillator 310, the shutter 320, the $\lambda/2$ wavelength plate unit 330, the polarizing plate unit 340, the beam expander 350, and the mirror unit 360 are attached to a main surface 301a of the attachment base 301. The attachment base 301 is a plate member that is attachable to and detachable from the device frame 210 (see FIG. 7). The laser output unit 300 is attached to the device frame 210 with the attachment base 301 interposed between the laser output unit 300 and the device frame 210. That is, the laser output unit 300 is attachable to and detachable from the device frame 210.

The cover 302 covers the plurality of mirrors 303, 304, the laser oscillator 310, the shutter 320, the $\lambda/2$ wavelength plate unit 330, the polarizing plate unit 340, the beam expander 350, and the mirror unit 360 on main surface 301a of the attachment base 301. The cover 302 is attachable to and detachable from the attachment base 301.

The laser oscillator 310 emits a linearly-polarized pulsed laser light L in the X-axis direction. A wavelength of the laser light L emitted from the laser oscillator 310 lies within any one of wavelength bands from 500 to 550 nm, 1000 to 1150 nm, or 1300 to 1400 nm. The laser light L in the wavelength band from 500 to 550 nm is suitable for internal absorption laser processing on a substrate made of, for example, sapphire. The laser light L in the wavelength band from 1000 to 1150 nm and the laser light L in the wavelength band from 1300 to 1400 nm are suitable for internal absorption laser processing on a substrate made of, for example, silicon. A polarization direction of the laser light L emitted from the laser oscillator 310 is, for example, a direction parallel to the Y-axis direction. The laser light L emitted from the laser oscillator 310 is reflected off the mirror 303 and enters on the shutter 320 in the Y-axis direction.

In the laser oscillator 310, the output of the laser light L is switched between ON and OFF as described below. In a configuration where the laser oscillator 310 is constituted of a solid-state laser, switching of a Q-switch (an acousto-optic modulator (AOM), an electro-optic modulator (EOM), or the like) provided in a resonator between ON and OFF causes the output of the laser light L to be switched between ON and OFF at high speed. In a configuration where the laser oscillator 310 is constituted of a fiber laser, switching of output of a semiconductor laser constituting a seed laser and amplifier (pump) laser between ON and OFF causes the output of the laser light L to be switched between ON and OFF at high speed. In a configuration where the laser oscillator 310 is formed of an external modulation element (an AOM, an EOM, or the like) provided outside the resonator, switching of the external modulation element between ON and OFF causes the output of the laser light L to be switched between ON and OFF at high speed.

The shutter 320 opens and closes the optical path of the laser light L with a mechanical mechanism. As described above, the switching of the output of the laser light L from the laser output unit 300 between ON and OFF is made by the switching of the output of the laser light L from the laser oscillator 310 between ON and OFF, and the shutter 320 is provided to prevent the laser light L from being unintentionally emitted from the laser output unit 300, for example. The laser light L that has passed through the shutter 320 is reflected off the mirror 304 and sequentially enters the λ/2 wavelength plate unit 330 and the polarizing plate unit 340 in the X-axis direction.

The λ/2 wavelength plate unit 330 and the polarizing plate unit 340 function as an output adjustment unit that adjusts the output (light intensity) of the laser light L. Further, the λ/2 wavelength plate unit 330 and the polarizing plate unit 340 function as a polarization direction adjustment unit that adjusts the polarization direction of the laser light L. Details of these functions will be described later. The laser light L that has sequentially passed through the λ/2 wavelength plate unit 330 and the polarizing plate unit 340 enters the beam expander 350 in the X-axis direction.

The beam expander 350 collimates the laser light L while adjusting a diameter of the laser light L. The laser light L that has passed through the beam expander 350 enters the mirror unit 360 in the X-axis direction.

The mirror unit 360 includes a support base 361 and a plurality of mirrors 362, 363. The support base 361 supports the plurality of mirrors 362, 363. The support base 361 is attached to the attachment base 301 to be adjustable in position in the X-axis direction and the Y-axis direction. The mirror (first mirror) 362 reflects, in the Y-axis direction, the laser light L that has passed through the beam expander 350. The mirror 362 is attached to the support base 361 to make its reflecting surface adjustable in angle about the axis parallel to the Z axis, for example. The mirror (second mirror) 363 reflects, in the Z-axis direction, the laser light L reflected off the mirror 362. The mirror 363 is attached to the support base 361 to make its reflecting surface adjustable in angle about the axis parallel to the X axis and adjustable in position in the Y-axis direction. The laser light L reflected off the mirror 363 passes through an opening 361a formed extending through the support base 361 and enters the laser condensing unit 400 (see FIG. 7) in the Z-axis direction. That is, an exit direction of the laser light L from the laser output unit 300 coincides with a movement direction of the laser condensing unit 400. As described above, each of the mirrors 362, 363 has a mechanism for adjusting the angle of the reflecting surface. In the mirror unit 360, the position of the support base 361 relative to the attachment base 301, the position of the mirror 363 relative to the support base 361, and the angle of the reflecting surface of each of the mirrors 362, 363 are adjusted to align the position and angle of the optical axis of the laser light L emitted from the laser output unit 300 with the laser condensing unit 400. That is, the plurality of mirrors 362, 363 are configured to adjust the optical axis of the laser light L emitted from the laser output unit 300.

Figure 10:
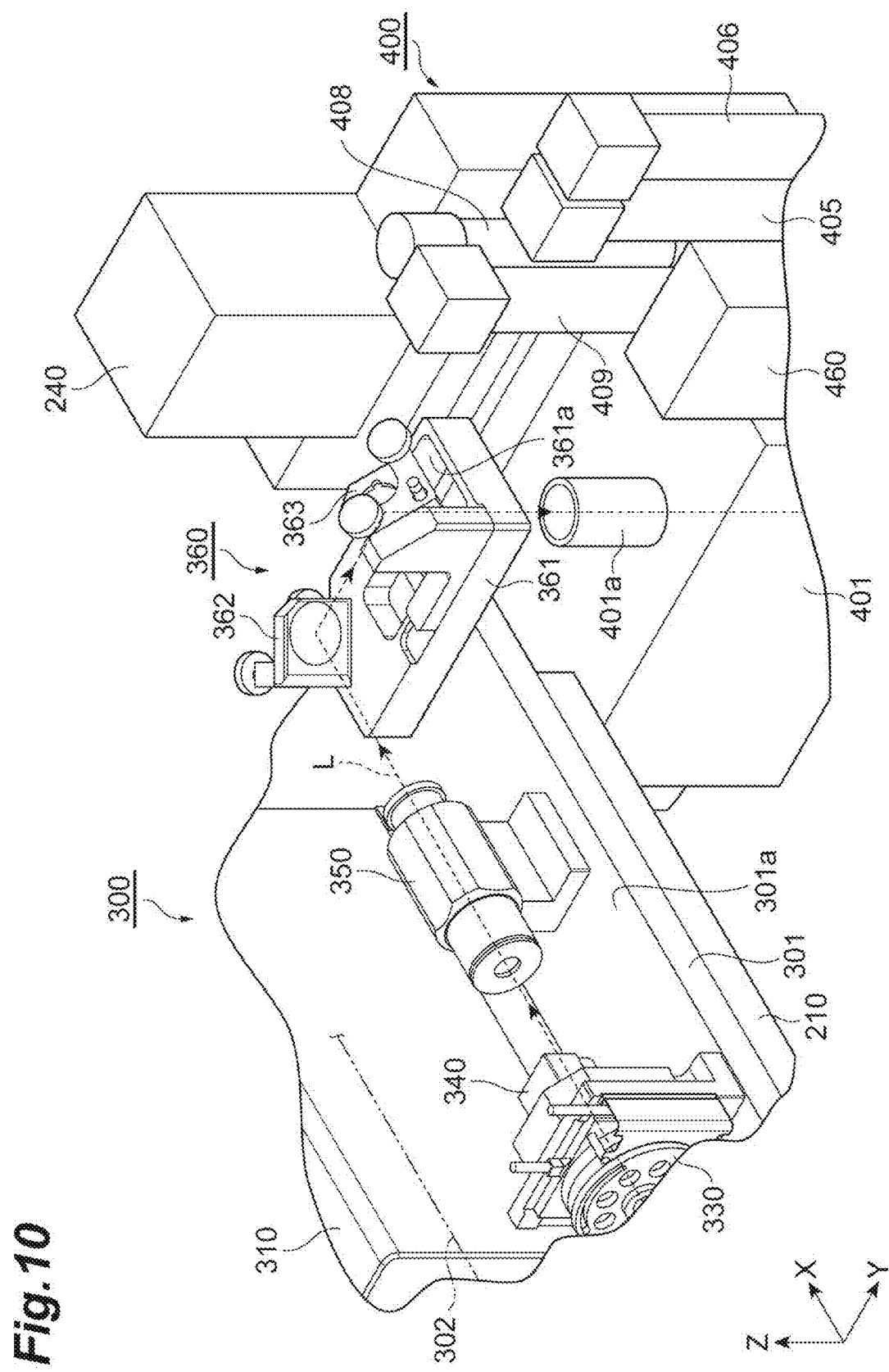
FIG. 10 is a partial perspective view of the laser output unit and a laser condensing unit of the laser processing device shown in FIG. 7.

As shown in FIG. 10, the laser condensing unit 400 includes a housing 401. The housing 401 has a rectangular parallelepiped shape whose longitudinal direction is the Y-axis direction. The second transfer mechanism 240 is attached to one side surface 401e of the housing 401 (see FIG. 11 and FIG. 13). The housing 401 is provided with a light entry port 401a having a cylindrical shape such that the light entry port 401a faces the opening 361a of the mirror unit 360 in the Z-axis direction. The light entry port 401a allows the laser light L emitted from the laser output unit 300 to enter the housing 401. The mirror unit 360 and the light entry port 401a are separated from each other by a distance that prevents the mirror unit 360 and the light entry port 401a from coming into contact with each other when the second transfer mechanism 240 moves the laser condensing unit 400 in the Z-axis direction.

Figure 11:
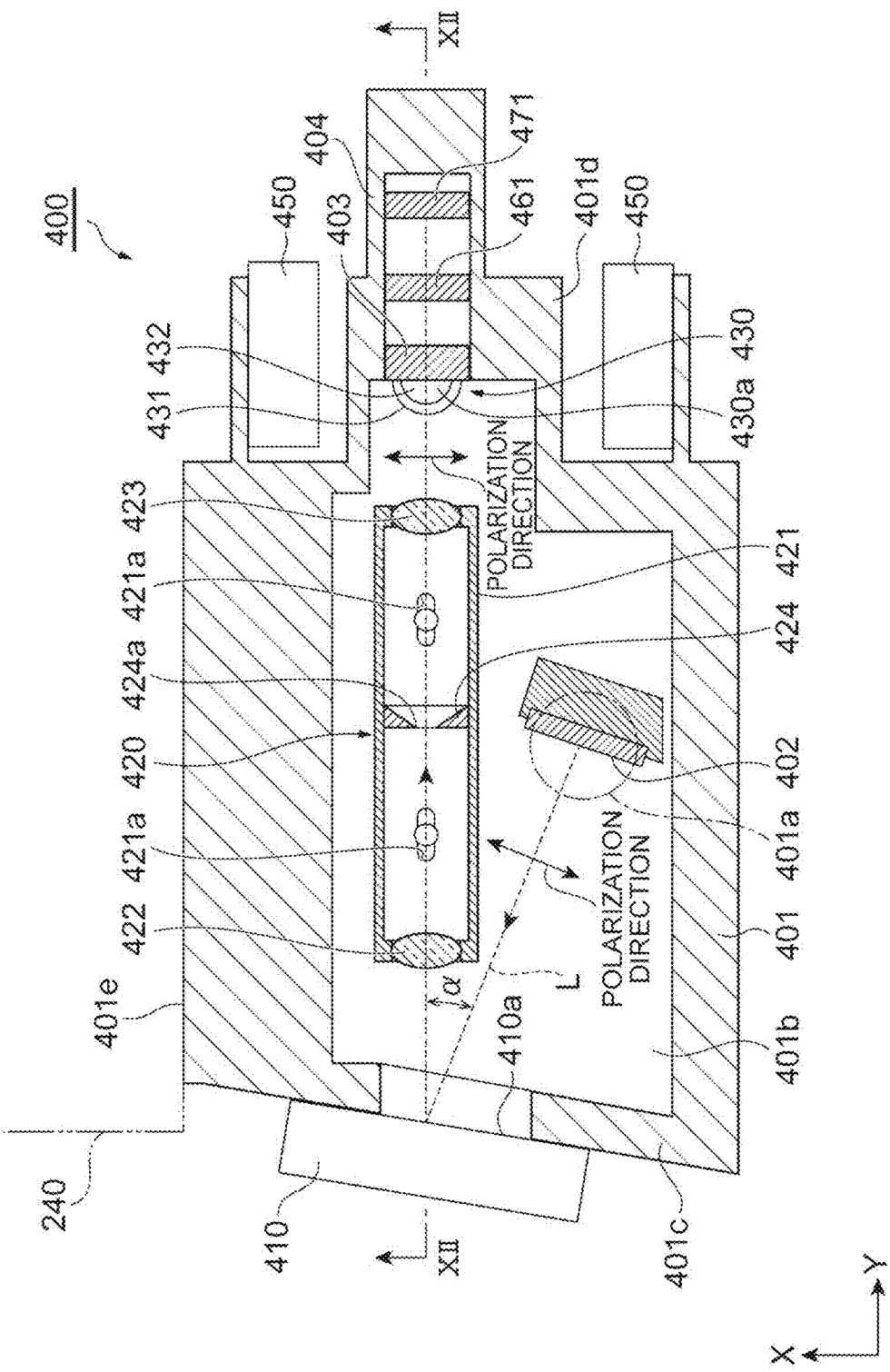
FIG. 11 is a cross-sectional view of the laser condensing unit, taken along an XY plane of FIG. 7.
Figure 12:
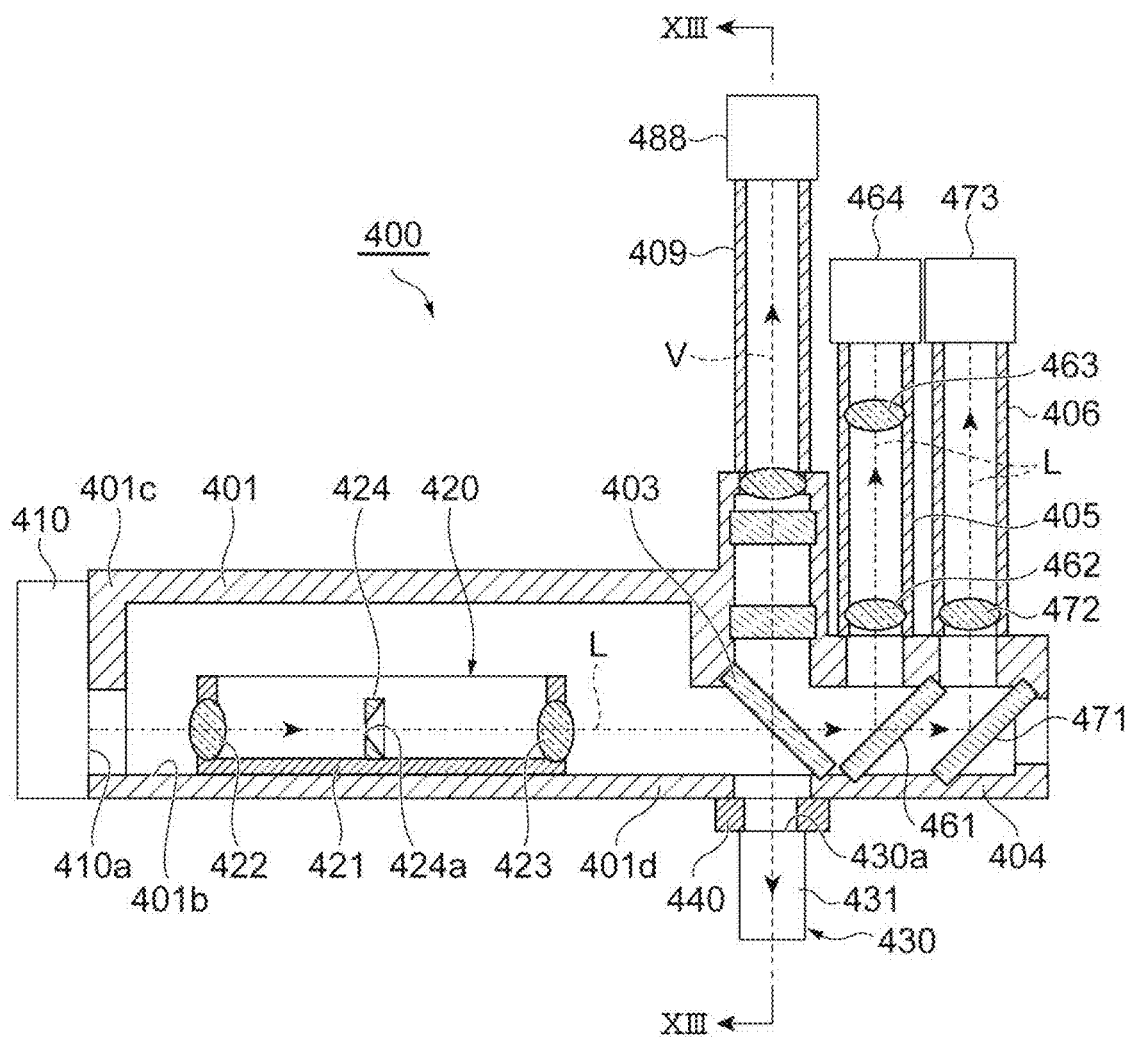
FIG. 12 is a cross-sectional view of the laser condensing unit, taken along line XII-XII of FIG. 11.

As shown in FIG. 11 and FIG. 12, the laser condensing unit 400 includes a mirror 402 and a dichroic mirror 403. The laser condensing unit 400 further includes a reflecting spatial light modulator (spatial light modulator) 410, a 4f lens unit 420, a condenser lens unit (light collection optical system) 430, a drive mechanism 440, and a pair of different-axis ranging sensors (first sensors) 450.

The mirror 402 is attached to a bottom surface 401b of the housing 401 to face the light entry port 401a in the Z-axis direction. The mirror 402 reflects, in a direction parallel to the XY plane, the laser light L entering the housing 401 through the light entry port 401a. The laser light L collimated by the beam expander 350 of the laser output unit 300 enters the mirror 402 in the Z-axis direction. That is, the laser light L enters the mirror 402 in the Z-axis direction as collimated light. Therefore, even when the laser condensing unit 400 is moved in the Z-axis direction by the second transfer mechanism 240, the state of the laser light L entering the mirror 402 in the Z-axis direction is kept unchanged. The laser light L reflected off the mirror 402 enters the reflecting spatial light modulator 410.

The reflecting spatial light modulator 410 is attached to an end 401c of the housing 401 in the Y-axis direction with a reflecting surface 410a facing the inside of the housing 401. The reflecting spatial light modulator 410 is, for example, a liquid crystal on silicon (LCOS) spatial light modulator (SLM) that modulates the laser light L and reflects the laser light L in the Y-axis direction. The laser light L modulated and reflected by the reflecting spatial light modulator 410 enters the 4f lens unit 420 in the Y-axis direction. Herein, in the plane parallel to the XY plane, an angle α formed between the optical axis of the laser light L entering the reflecting spatial light modulator 410 and the optical axis of the laser light L exiting from the reflecting spatial light modulator 410 is an acute angle (for example, 10 to 60°). That is, the laser light L is reflected at an acute angle along the XY plane by the reflecting spatial light modulator 410. This is because an entry angle and a reflection angle of the laser light L are made small to suppress a decrease in diffraction efficiency and then fully exhibit the performance of the reflecting spatial light modulator 410. Note that, in the reflecting spatial light modulator 410, for example, a light modulation layer using a liquid crystal has a thickness of about several μm to several tens μm that is extremely thin, so that the reflecting surface 410a can be regarded as substantially the same as a light entry and exit surface of the light modulation layer.

The 4f lens unit 420 includes a holder 421, a lens (imaging optical system) 422 adjacent to the reflecting spatial light modulator 410, a lens (imaging optical system) 423 adjacent to the condenser lens unit 430, and a slit member 424. The holder 421 holds the pair of lenses 422, 423 and the slit member 424. The holder 421 keeps a positional relation between the pair of lenses 422, 423 and the slit member 424 in a direction along the optical axis of the laser light L unchanged. The pair of lenses 422, 423 constitute a both-side telecentric optical system in which the reflecting surface 410a of the reflecting spatial light modulator 410 and an entrance pupil surface 430a of the condenser lens unit 430 have an imaging relation. This allows an image of the laser light L (image of the laser light L modulated by the reflecting spatial light modulator 410) on the reflecting surface 410a of the reflecting spatial light modulator 410 to be transferred (formed) onto the entrance pupil surface 430a of the condenser lens unit 430. The slit member 424 has a slit 424a formed therethrough. The slit 424a is located between the lens 422 and the lens 423 and in the vicinity of a focal plane of the lens 422. Unnecessary components of the laser light L modulated and reflected by the reflecting spatial light modulator 410 are blocked by the slit member 424. The laser light L that has passed through the 4f lens unit 420 enters the dichroic mirror 403 in the Y-axis direction.

The dichroic mirror 403 reflects most (for example, 95 to 99.5%) of the laser light L in the Z-axis direction and transmits some (for example, 0.5 to 5%) of the laser light L in the Y-axis direction. Most of the laser light L is reflected off the dichroic mirror 403 at a right angle along the ZX plane. The laser light L reflected off the dichroic mirror 403 enters the condenser lens unit 430 in the Z-axis direction.

The condenser lens unit 430 is attached to an end 401d of the housing 401 in the Y-axis direction (an end on the opposite side of the housing 401 with respect to the end 401c) with the drive mechanism 440 interposed between the condenser lens unit 430 and the end 401d. The condenser lens unit 430 includes a holder 431 and a plurality of lenses 432. The holder 431 holds the plurality of lenses 432. The plurality of lenses 432 converge the laser light L at the object 1 (see FIG. 7) supported on the support table 230. The drive mechanism 440 moves the condenser lens unit 430 in the Z-axis direction with driving force produced by a piezoelectric element.

The pair of different-axis ranging sensors 450 are attached to the end 401d of the housing 401 to be positioned adjacent to both sides of the condenser lens unit 430 in the X-axis direction. Each of the different-axis ranging sensors 450 emits first ranging laser light to the laser light entry surface of the object 1 (see FIG. 7) supported on the support table 230 and detects ranging light reflected off the laser light entry surface to acquire displacement data on the laser light entry surface of the object 1. Note that, as the different-axis ranging sensor 450, for example, a triangulation sensor, a laser confocal sensor, a white confocal sensor, a spectral interference sensor, an astigmatism sensor, or the like may be used.

The laser condensing unit 400 includes a beam splitter 461, a pair of lenses 462, 463, and a camera 464 used for monitoring intensity distribution of the laser light L. The beam splitter 461 splits the laser light L that has passed through the dichroic mirror 403 into a reflection component and a transmission component. The laser light L reflected off the beam splitter 461 sequentially enters the pair of lenses 462, 463 and the camera 464 in the Z-axis direction. The pair of lenses 462, 463 constitute a both-side telecentric optical system in which the entrance pupil surface 430a of the condenser lens unit 430 and an imaging surface of the camera 464 have an imaging relation. This allows an image of the laser light L on the entrance pupil surface 430a of the condenser lens unit 430 to be transferred (formed) onto the imaging surface of the camera 464. As described above, the image of the laser light L on the entrance pupil surface 430a of the condenser lens unit 430 is the image of the laser light L modulated by the reflecting spatial light modulator 410. Therefore, the laser processing device 200 can grasp an operation state of the reflecting spatial light modulator 410 by monitoring the imaging result from the camera 464.

The laser condensing unit 400 further includes a beam splitter 471, a lens 472, and a camera 473 used for monitoring an optical axis position of the laser light L. The beam splitter 471 splits the laser light L that has passed through the beam splitter 461 into a reflection component and a transmission component. The laser light L reflected off the beam splitter 471 sequentially enters the lens 472 and the camera 473 in the Z-axis direction. The lens 472 converges the entering laser light L onto an imaging surface of the camera 473. The laser processing device 200 is capable of adjusting, while monitoring the imaging result from each of the camera 464 and the camera 473, the position of the support base 361 relative to the attachment base 301, the position of the mirror 363 relative to the support base 361, and the angle of the reflecting surface of each of the mirrors 362, 363 in the mirror unit 360 (see FIG. 9 and FIG. 10) to correct misalignment of the optical axis of the laser light L entering the condenser lens unit 430 (positional misalignment of the intensity distribution of the laser light relative to the condenser lens unit 430 and angular misalignment of the optical axis of the laser light L relative to the condenser lens unit 430).

The plurality of beam splitters 461, 471 are arranged in a tubular body 404 extending from the end 401d of the housing 401 in the Y-axis direction. The pair of lenses 462, 463 are arranged in a tubular body 405 standing erect on the tubular body 404 in the Z-axis direction, and the camera 464 is disposed at an end of the tubular body 405. The lens 472 is disposed in a tubular body 406 standing erect on the tubular body 404 in the Z-axis direction, and the camera 473 is disposed at an end of the tubular body 406. The tubular body 405 and the tubular body 406 are arranged side by side in the Y-axis direction. Note that the laser light L that has passed through the beam splitter 471 may be absorbed by a damper or the like provided at an end of the tubular body 404 or may be used for other applications as needed.

Figure 13:
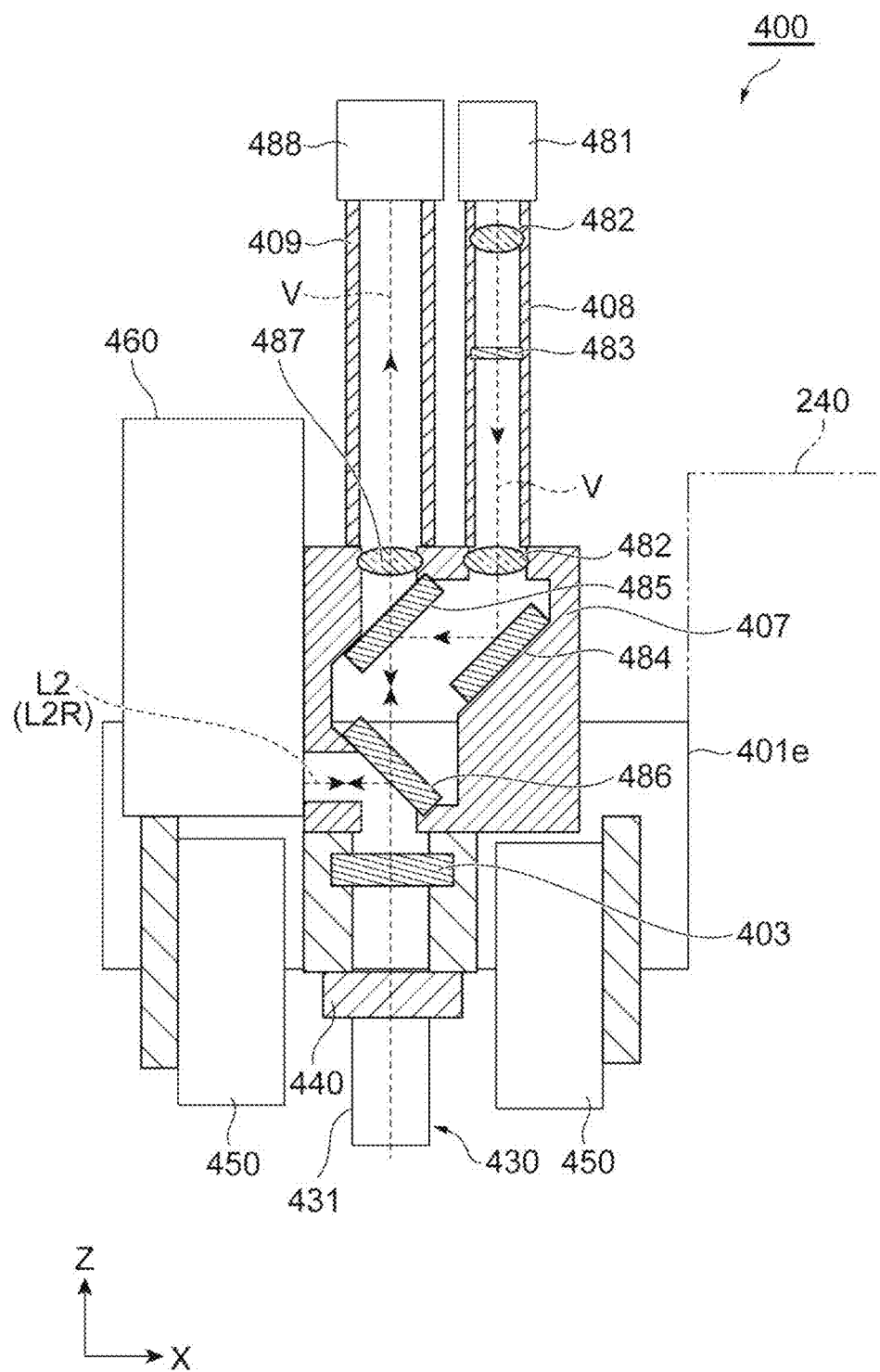
FIG. 13 is a cross-sectional view of the laser condensing unit, taken along line XIII-XIII of FIG. 12.

As shown in FIG. 12 and FIG. 13, the laser condensing unit 400 includes a visible light source 481, a plurality of lenses 482, a reticle 483, a mirror 484, a half mirror 485, a beam splitter 486, and a lens 487, an observation camera 488, and a co-axis ranging sensor (second sensor) 460. The visible light source 481 emits visible light V in the Z-axis direction. The plurality of lenses 482 collimate the visible light V emitted from the visible light source 481. The reticle 483 gives a scale line to the visible light V. The mirror 484 reflects, in the X-axis direction, the visible light V collimated by the plurality of lenses 482. The half mirror 485 splits the visible light V reflected off the mirror 484 into a reflection component and a transmission component. The visible light V reflected off the half mirror 485 sequentially passes through the beam splitter 486 and the dichroic mirror 403 in the Z-axis direction and is projected to the object 1 supported on the support table 230 through the condenser lens unit 430. (see FIG. 7).

The visible light V projected to the object 1 is reflected off the laser light entry surface of the object 1, enters the dichroic mirror 403 through the condenser lens unit 430, and passes through the dichroic mirror 403 in the Z-axis direction. The beam splitter 486 splits the visible light V that has passed through the dichroic mirror 403 into a reflection component and a transmission component. Further, the beam splitter 486 reflects a second ranging laser light L2 and a reflected light L2R of the second ranging laser light L2 (to be described later). The visible light V that has passed through the beam splitter 486 passes through the half mirror 485, and sequentially enters the lens 487 and the observation camera 488 in the Z-axis direction. The lens 487 converges the entering visible light V onto the imaging surface of the observation camera 488. The laser processing device 200 can grasp a state of the object 1 by observing the imaging result from the observation camera 488.

The mirror 484, the half mirror 485, and the beam splitter 486 are arranged in a holder 407 attached onto the end 401d of the housing 401. The plurality of lenses 482 and the reticle 483 are arranged in a tubular body 408 standing erect on the holder 407 in the Z-axis direction, and the visible light source 481 is disposed at an end of the tubular body 408. The lens 487 is disposed in a tubular body 409 standing erect on the holder 407 in the Z-axis direction, and the observation camera 488 is disposed at an end of the tubular body 409. The tubular body 408 and the tubular body 409 are arranged side by side in the X-axis direction. Note that the visible light V that has passed through the half mirror 485 in the X-axis direction and the visible light V reflected off the beam splitter 486 in the X-axis direction may be each absorbed by a damper or the like provided on a wall portion of the holder 407 or may be used for other applications as needed.

The co-axis ranging sensor 460 is attached to a side surface of the holder 407. The co-axis ranging sensor 460 emits the second ranging laser light L2 to the laser light entry surface of the object 1 (see FIG. 7) supported on the support table 230 and detects the reflected light L2R of the second ranging laser light L2 reflected off the laser light entry surface to acquire displacement data on the laser light entry surface of v 1. The second ranging laser light L2 emitted from the co-axis ranging sensor 460 is reflected off the beam splitter 486, guided to the condenser lens unit 430 after passing through the dichroic mirror 403, and then reflected off the laser light entry surface near a focus of the condenser lens unit 430. The reflected light L2R returns to the co-axis ranging sensor 460 along a path reverse to the path of the second ranging laser light L2. The co-axis ranging sensor 460 acquires the displacement data on the object 1 by utilizing a phenomenon that a state of the reflected light L2R changes depending on a position on the laser light entry surface relative to the condenser lens unit 430. As the co-axis ranging sensor 460, for example, an astigmatism sensor may be used.

The laser processing device 200 is designed to allow replacement of the laser output unit 300. This is because the wavelength of the laser light L suitable for processing varies depending on, for example, specifications and processing conditions of the object 1. Therefore, a plurality of laser output units 300 that emit the laser light L different in wavelength from each other are prepared. Prepared herein are a laser output unit 300 that emits the laser light L whose wavelength lies within the wavelength band from 500 to 550 nm, a laser output unit 300 that emits the laser light L whose wavelength lies within the wavelength band from 1000 to 1150 nm, and a laser output unit 300 that emits the laser light L whose wavelength lies within the wavelength band from 1300 to 1400 nm.

On the other hand, the laser processing device 200 is not designed to allow replacement of the laser condensing unit 400. This is because the laser condensing unit 400 is compatible with multiple wavelengths (adaptable to a plurality of wavelength bands that are separate from each other). Specifically, the mirror 402, the reflecting spatial light modulator 410, the pair of lenses 422, 423 of the 4f lens unit 420, the dichroic mirror 403, the lens 432 of the condenser lens unit 430, and the like support multiple wavelengths. Herein, the laser condensing unit 400 is compatible with the wavelength bands from 500 to 550 nm, 1000 to 1150 nm, and 1300 to 1400 nm. This is realized by designing each component of the laser condensing unit 400 to satisfy desired optical performance, such as coating each component of the laser condensing unit 400 with a predetermined dielectric multilayer film. Note that, in the laser output unit 300, the λ/2 wavelength plate unit 330 includes a λ/2 wavelength plate, and the polarizing plate unit 340 includes a polarizing plate. The λ/2 wavelength plate and the polarizing plate are optical elements that are highly dependent on wavelength. Therefore, the λ/2 wavelength plate unit 330 and the polarizing plate unit 340 having a configuration different for each wavelength band are provided in the laser output unit 300.

[Optical Path and Polarization Direction of Laser Light in Laser Processing Device]

In the laser processing device 200, the polarization direction of the laser light L converged at the object 1 supported on the support table 230 is the direction parallel to the X-axis direction, and, as shown in FIG. 11, coincides with the processing direction (scan direction of the laser light L). Herein, in the reflecting spatial light modulator 410, the laser light L is reflected as P-polarized light. This is because, in a configuration where a liquid crystal is used in the light modulation layer of the reflecting spatial light modulator 410, when the liquid crystal is aligned to make liquid crystal molecules tilted in a plane parallel to a plane including the optical axis of the laser light L entering and exiting from the reflecting spatial light modulator 410, the laser light L is phase-modulated with a polarization plane prevented from rotating (for example, see Japanese Patent No. 3878758). On the other hand, the dichroic mirror 403 reflects the laser light L as S-polarized light. This is because a configuration where the laser light L is reflected as S-polarized light rather than P-polarized light reduces, for example, the number of coatings of the dielectric multilayer film for making the dichroic mirror 403 compatible with multiple wavelengths, which in turn makes the designing of the dichroic mirror 403 easy.

Therefore, in the laser condensing unit 400, the optical path extending from the mirror 402 to the dichroic mirror 403 through the reflecting spatial light modulator 410 and the 4f lens unit 420 is set along the XY plane, and the optical path extending from the dichroic mirror 403 to the condenser lens unit 430 is set along the Z-axis direction.

As shown in FIG. 9, in the laser output unit 300, the optical path of the laser light L is set along the X-axis direction or the Y-axis direction (along a plane parallel to the main surface 301a). Specifically, the optical path extending from the laser oscillator 310 to the mirror 303 and the optical path extending from the mirror 304 to the mirror unit 360 through the λ/2 wavelength plate unit 330, the polarizing plate unit 340, and the beam expander 350 are set along the X-axis direction, and the optical path extending from the mirror 303 to the mirror 304 through the shutter 320 and the optical path extending from the mirror 362 to the mirror 363 in the mirror unit 360 are set along the Y-axis direction.

Herein, the laser light L traveling from the laser output unit 300 to the laser condensing unit 400 in the Z-axis direction is reflected off the mirror 402 in the direction parallel to the XY plane and then enters the reflecting spatial light modulator 410 as shown in FIG. 11. At this time, in the plane parallel to the XY plane, the optical axis of the laser light L entering the reflecting spatial light modulator 410 and the optical axis of the laser light L exiting from the reflecting spatial light modulator 410 forms the angle α that is an acute angle. On the other hand, as described above, in the laser output unit 300, the optical path of the laser light L is set along the X-axis direction or the Y-axis direction.

Therefore, in the laser output unit 300, the λ/2 wavelength plate unit 330 and the polarizing plate unit 340 need to function as not only an output adjustment unit that adjusts the output of the laser light L, but also a polarization direction adjustment unit that adjusts the polarization direction of the laser light L.

[λ/2 Wavelength Plate Unit and Polarizing Plate Unit]

Figure 14:
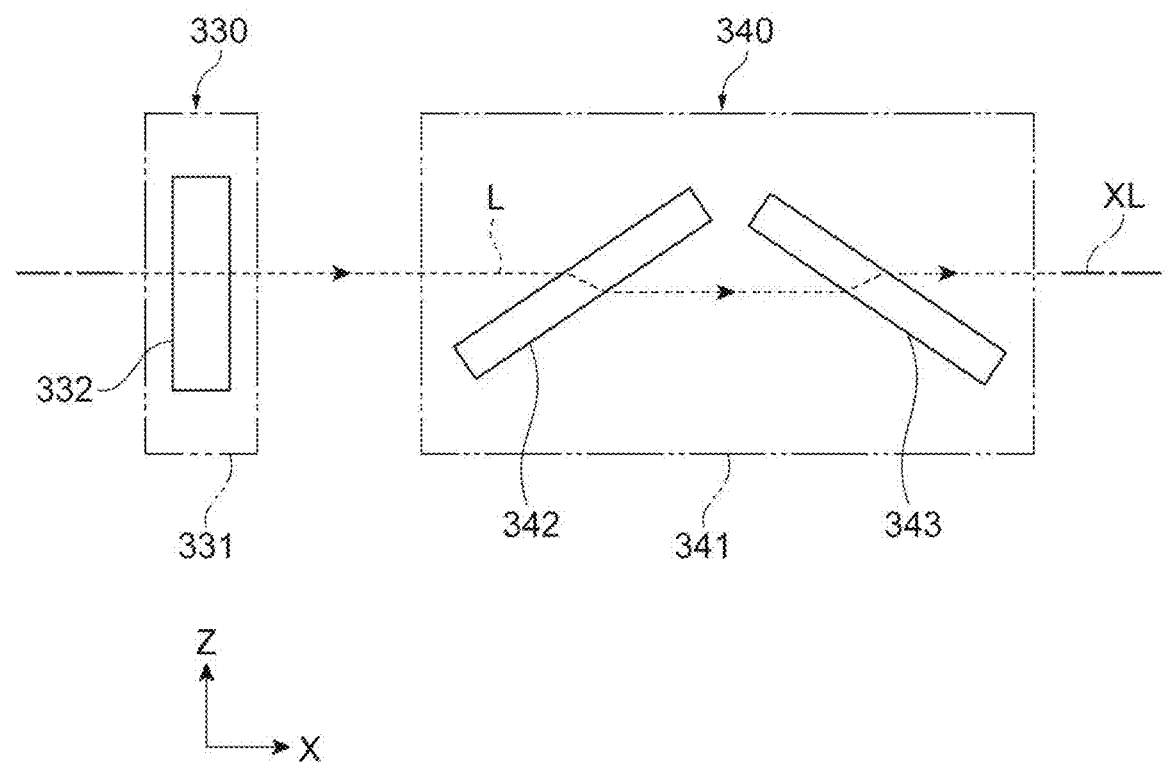
FIG. 14 is a diagram showing an optical arrangement relation between a $\lambda/2$ wavelength plate unit and a polarizing plate unit of the laser output unit shown in FIG. 9.

As shown in FIG. 14, the λ/2 wavelength plate unit 330 includes a holder (first holder) 331 and a λ/2 wavelength plate 332. The holder 331 holds the λ/2 wavelength plate 332 to make the λ/2 wavelength plate 332 rotatable about an axis (first axis) XL parallel to the X-axis direction. When receiving the laser light L having the polarization direction inclined by an angle θ relative to its optical axis (for example, fast axis), the λ/2 wavelength plate 332 rotates the polarization direction of the laser light L by an angle 2θ about the axis XL and then causes the laser light L to exit (see FIG. 15(a)).

The polarizing plate unit 340 includes a holder (second holder) 341, a polarizing plate (polarizing member) 342, and an optical path correcting plate (optical path correcting member) 343. The holder 341 holds the polarizing plate 342 and the optical path correcting plate 343 to make the polarizing plate 342 and the optical path correcting plate 343 rotatable together about the axis (second axis) XL. A light entry surface and light exit surface of the polarizing plate 342 are inclined by a predetermined angle (for example, Brewster's angle). When receiving the laser light L, the polarizing plate 342 transmits a P-polarized light component of the laser light L that coincides with a polarization axis of the polarizing plate 342 and reflects or absorbs an S-polarized light component of the laser light L (see FIG. 15(b)). A light entry surface and light exit surface of the optical path correcting plate 343 are inclined to the opposite side from the light entry surface and light exit surface of the polarizing plate 342, respectively. The optical path correcting plate 343 returns, to the axis XL, the optical axis of the laser light L that is misaligned from the axis XL after passing through the polarizing plate 342.

As described above, in the laser condensing unit 400, in the plane parallel to the XY plane, the optical axis of the laser light L entering the reflecting spatial light modulator 410 and the optical axis of the laser light L exiting from the reflecting spatial light modulator 410 forms the angle α that is an acute angle (see FIG. 11). On the other hand, in the laser output unit 300, the optical path of the laser light L is set along the X-axis direction or the Y-axis direction (see FIG. 9).

Figure 15:
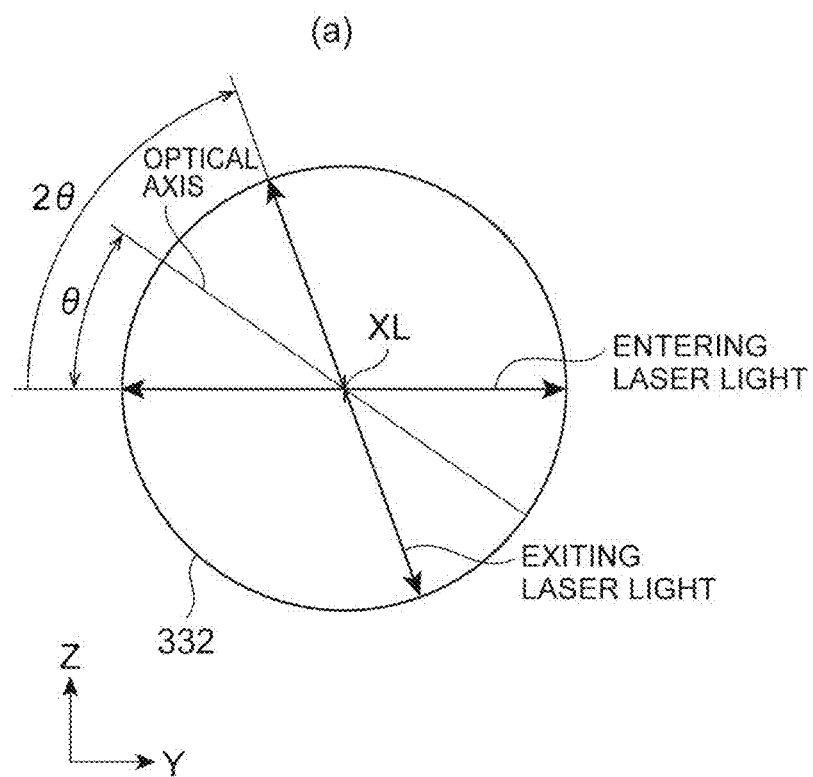
FIG. 15(a) is a diagram showing a polarization direction of the $\lambda/2$ wavelength plate unit of the laser output unit shown in FIG. 9.
FIG. 15(b) is a diagram showing a polarization direction of the polarizing plate unit of the laser output unit shown in FIG. 9.
Figure 15:
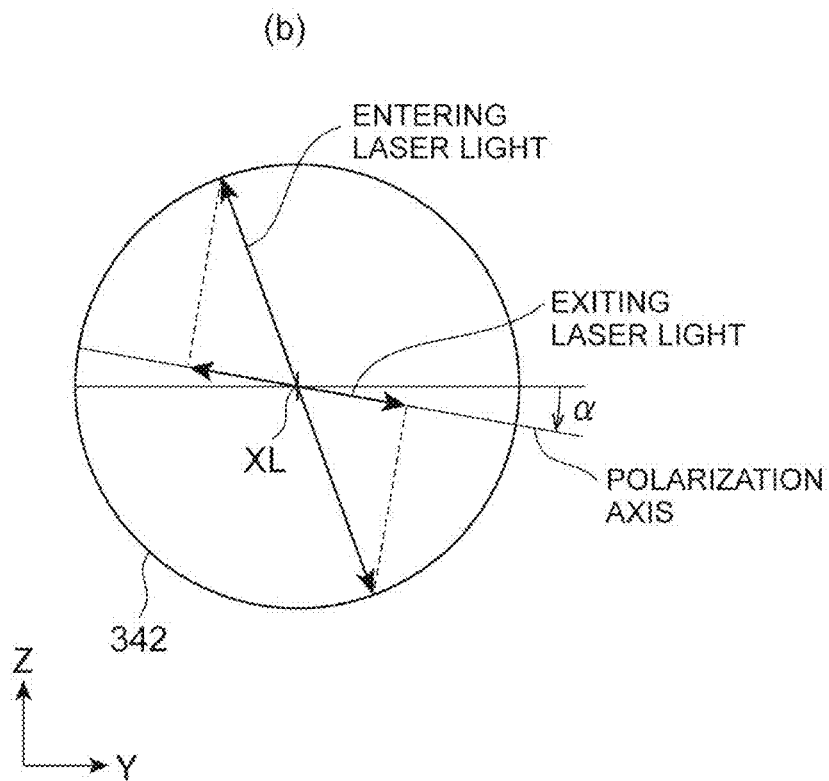

Therefore, in the polarizing plate unit 340, the polarizing plate 342 and the optical path correcting plate 343 are rotated together about the axis XL, and, as shown in FIG. 15(b), the polarization axis of the polarizing plate 342 is inclined by the angle α relative to the direction parallel to the Y-axis direction. This in turn inclines the polarization direction of the laser light L exiting from the polarizing plate unit 340 by the angle α relative to the direction parallel to the Y-axis direction. As a result, the laser light L is reflected off the reflecting spatial light modulator 410 as P-polarized light and then reflected off the dichroic mirror 403 as S-polarized light to make the polarization direction of the laser light L to be converged at the object 1 supported on the support table 230 parallel to the X-axis direction.

Further, as shown in FIG. 15(b), the polarization direction of the laser light L entering the polarizing plate unit 340 is adjusted, and accordingly the light intensity of the laser light L exiting from the polarizing plate unit 340 is adjusted. In order to adjust of the polarization direction of the laser light L entering the polarizing plate unit 340, the λ/2 wavelength plate 332 is rotated about the axis XL in the λ/2 wavelength plate unit 330 to adjust, as shown in FIG. 15(a), the angle of the optical axis of the λ/2 wavelength plate 332 relative to the polarization direction of the laser light L entering the λ/2 wavelength plate 332 (for example, the direction parallel to the Y-axis direction).

As described above, in the laser output unit 300, the λ/2 wavelength plate unit 330 and the polarizing plate unit 340 function not only as an output adjustment unit that adjusts the output of the laser light L (in the above-described example, an output attenuation unit), but also a polarization direction adjustment unit that adjusts the polarization direction of the laser light L.

[4f Lens Unit]

Figure 16:
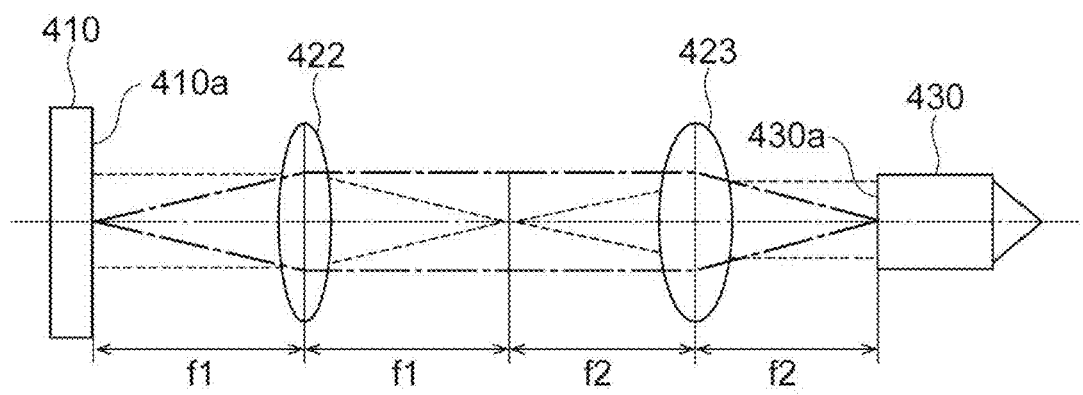
FIG. 16 is a diagram showing an optical arrangement relation between a reflecting spatial light modulator, a 4f lens unit, and a condenser lens unit of the laser condensing unit shown in FIG. 11.

As described above, the pair of lenses 422, 423 of the 4f lens unit 420 constitute a both-side telecentric optical system in which the reflecting surface 410a of the reflecting spatial light modulator 410 and the entrance pupil surface 430a of the condenser lens unit 430 have an imaging relation. Specifically, as shown in FIG. 16, a length of an optical path between the lens 422 adjacent to the reflecting spatial light modulator 410 and the reflecting surface 410a of the reflecting spatial light modulator 410 is defined as a first focal length f1 of the lens 422, a length of an optical path between the lens 423 adjacent to the condenser lens unit 430 and the entrance pupil surface 430a of the condenser lens unit 430 is defined as a second focal length f2 of the lens 423, and a length of an optical path between the lens 422 and the lens 423 is equal to the sum of the first focal length f1 and the second focal length f2 (that is, f1+f2). Of the optical paths from the reflecting spatial light modulator 410 to the condenser lens unit 430, the optical path between the pair of lenses 422, 423 linearly extends.

In the laser processing device 200, from the viewpoint of increasing an effective aperture of the laser light L on the reflecting surface 410a of the reflecting spatial light modulator 410, a magnification M of the both-side telecentric optical system satisfies 0.5<M<1 (reduction system). As the effective aperture of the laser light L on the reflecting surface 410a of the reflecting spatial light modulator 410 is larger, the laser light L is modulated with a higher-definition phase pattern. From the viewpoint of suppressing an increase in length of the optical path of the laser light L from the reflecting spatial light modulator 410 to the condenser lens unit 430, 0.6≤M≤0.95 may be satisfied. Herein, (the magnification M of the both-side telecentric optical system)=(a size of an image on the entrance pupil surface 430a of the condenser lens unit 430)/(a size of an object on the reflecting surface 410a of the reflecting spatial light modulator 410)) holds. For the laser processing device 200, the magnification M of the both-side telecentric optical system, the first focal length f1 of the lens 422, and the second focal length f2 of the lens 423 satisfy M=f2/f1.

Note that, from the viewpoint of reducing the effective aperture of the laser light L on the reflecting surface 410a of the reflecting spatial light modulator 410, the magnification M of the both-side telecentric optical system may satisfy 1<M<2 (enlargement system). The smaller the effective aperture of the laser light L on the reflecting surface 410a of the reflecting spatial light modulator 410, the smaller the magnification of the beam expander 350 (see FIG. 9) may become, and accordingly, the angle α (see FIG. 11) formed by the optical axis of the laser light L entering the reflecting spatial light modulator 410 and the optical axis of the laser light L exiting from the reflecting spatial light modulator 410 becomes small in the plane parallel to the XY plane. From the viewpoint of suppressing an increase in length of the optical path of the laser light L from the reflecting spatial light modulator 410 to the condenser lens unit 430, 1.05≤M≤1.7 may be satisfied.

Figure 17:
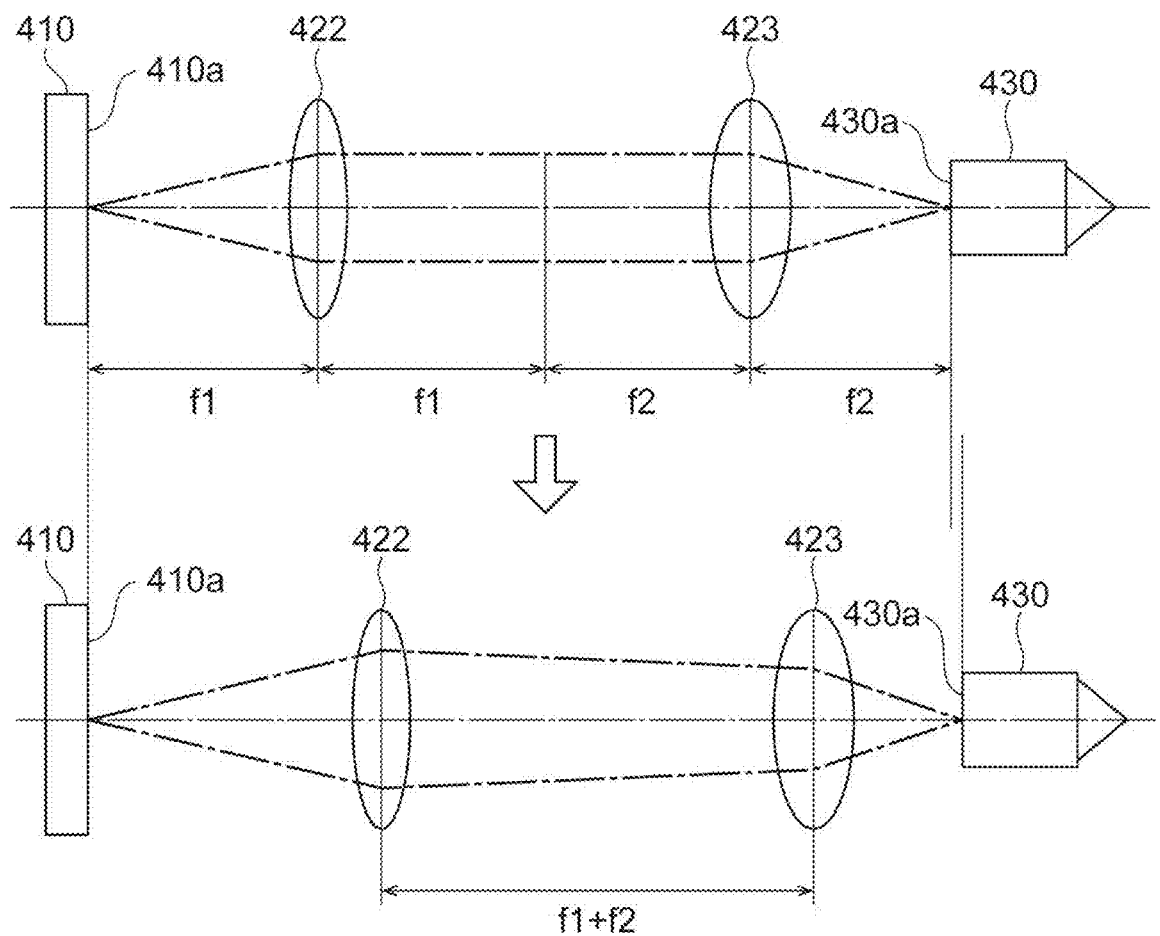
FIG. 17 is a diagram showing a shift in conjugate point in response to movement of the 4f lens unit shown in FIG. 16.

In the 4f lens unit 420, the magnification M of the both-side telecentric optical system is not equal to 1, and thus, as shown in FIG. 17, when the pair of lenses 422, 423 move along the optical axis, a conjugate point adjacent to the condenser lens unit 430 moves accordingly. Specifically, in a case of the magnification M<1 (reduction system), when the pair of lenses 422, 423 move along the optical axis toward the condenser lens unit 430, the conjugate point adjacent to the condenser lens unit 430 moves away from the reflecting spatial light modulator 410. On the other hand, in a case of the magnification M>1 (enlargement system), when the pair of lenses 422, 423 move along the optical axis toward the reflecting spatial light modulator 410, the conjugate point adjacent to the condenser lens unit 430 moves away from the reflecting spatial light modulator 410. Thus, for example, when the attachment position of the condenser lens unit 430 is misaligned, the conjugate point adjacent to the condenser lens unit 430 is aligned with the entrance pupil surface 430a of the condenser lens unit 430. In the 4f lens unit 420, as shown in FIG. 11, a plurality of long holes 421a extending in the Y-axis direction are formed through the bottom wall of the holder 421, and the holder 421 is bolted to the bottom surface 401b of the housing 401 through each of the long holes 421a. Accordingly, the pair of lenses 422, 423 are adjusted in position in the direction along the optical axis by adjusting a position where the holder 421 is fixed to the bottom surface 401b of the housing 401 in the Y-axis direction.

[Different-Axis Ranging Sensor and Co-Axis Ranging Sensor]

Figure 18:
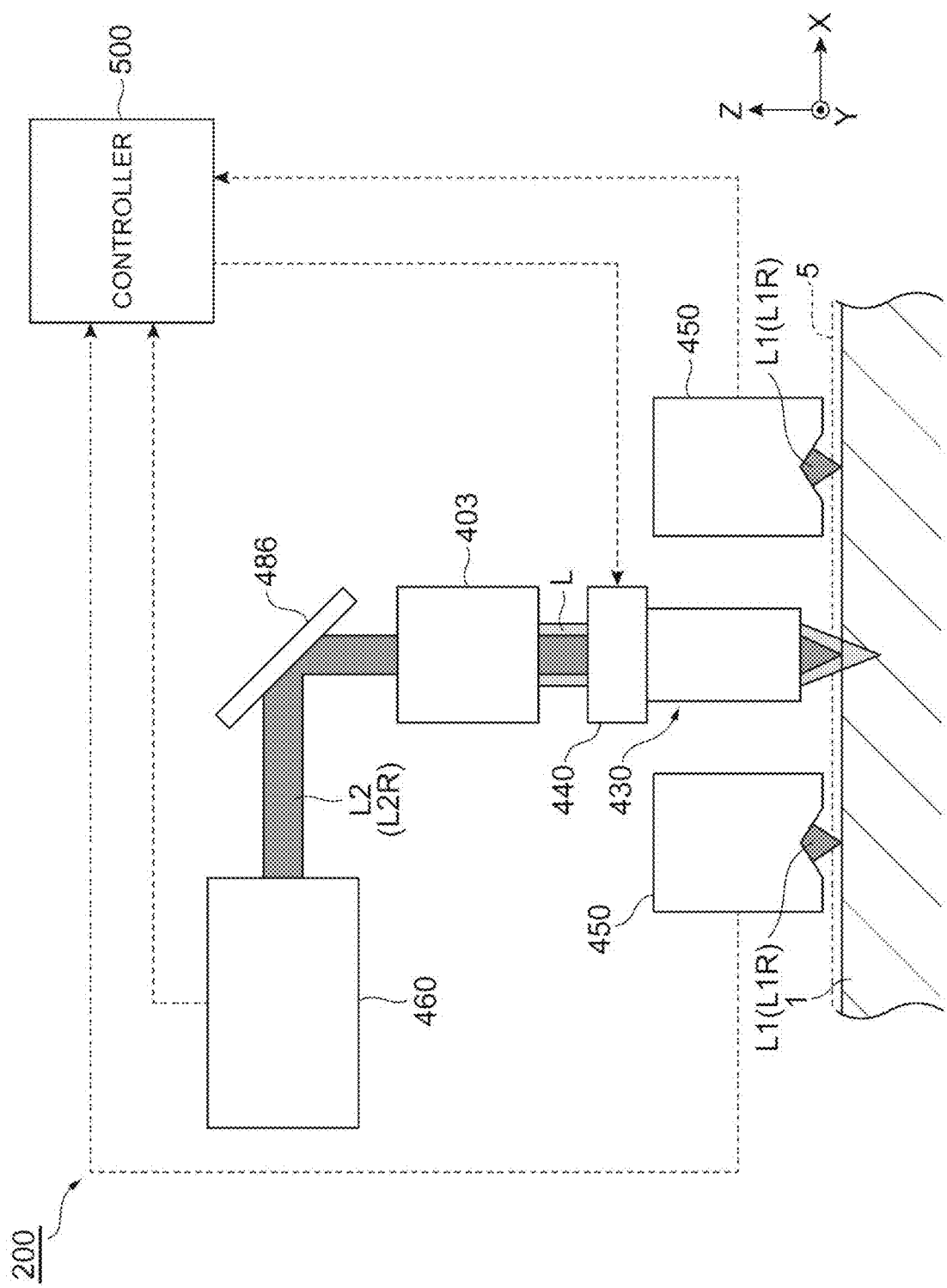
FIG. 18 is a schematic diagram for describing a co-axis ranging sensor and different-axis ranging sensors of the laser processing device shown in FIG. 7.

As shown in FIG. 18, the different-axis ranging sensors 450 irradiate the object 1 with first ranging laser light L1 different in axis from the laser light L without through the condenser lens unit 430 and receives reflected light L1R of the first ranging laser light L1 to acquire displacement data on the laser light entry surface. A pair (plurality) of the different-axis ranging sensors 450 are provided. The pair of different-axis ranging sensors 450 are disposed on one side and the other side of the condenser lens unit 430 in the X direction. The co-axis ranging sensor 460 irradiates the object with the second ranging laser light L2 coaxial with the laser light L through the condenser lens unit 430 and receives the reflected light L2R of the second ranging laser light L2 to acquire displacement data on the laser light entry surface. The displacement data thus acquired is transmitted to the controller 500.

The displacement data is a signal representing displacement, for example, an error signal. As an example, the error signal can be generated from the following calculation based on a detection result of splitting a varying beam shape and detecting the beam shape thus split.

Error signal=$[(I_A+I_C)-(I_B+I_D)]/[(I_A+I_B+I_C+I_D)]$ where,
$I_A$ represents a signal value output based on a light amount of a first light receiving surface among four light receiving surfaces that result from splitting a receiving surface in four,
$I_B$ represents a signal value output based on a light amount of a second light receiving surface among the four light receiving surfaces,
$I_C$ represents a signal value output based on a light amount of a third light receiving surface among the four light receiving surfaces, and
$I_D$ represents a signal value output based on a light amount of a fourth light receiving surface among the four light receiving surfaces.

In the laser processing device 200, as described above, the direction parallel to the X-axis direction is the processing direction (scan direction of the laser light L). Therefore, when the concentration point of the laser light L is relatively moved along the to-be-cut line 5, a different-axis ranging sensor 450 of the pair of different-axis ranging sensors 450 that precedes the condenser lens unit 430 can acquire displacement data on the laser light entry surface of the object 1 along the to-be-cut line 5.

The different-axis ranging sensors 450 have the following advantages. There are few design restrictions (wavelength, polarization, and the like). As described above, since the displacement data on the laser light entry surface located ahead of the condenser lens unit 430 can be acquired, the shape of the laser light entry surface (the shape of the object 1) can be grasped in advance. A ranging point is different from a control point, and thus displacement data can be acquired ahead of the condenser lens unit 430. Even when there is an edge of the object 1 or steep displacement on the object 1, following motion is less likely to be disturbed (control takes more time, or vibrations occur).

On the other hand, the co-axis ranging sensor 46 has the following advantages. Influences of disturbance (vibrations, thermal expansion, and the like) can be canceled. An influence of position misalignment can be canceled. Since the ranging point and the control point are the same, even when the support table 230 is vibrated or distorted, the distance between the condenser lens unit 430 and the laser light entry surface can be kept constant by feedback control that takes into account the vibration or distortion, which in turn makes it possible to suppress errors occurring in a control result.

The controller 500 drives the drive mechanism 440 to cause the condenser lens unit 430 to follow the laser light entry surface based on at least one of the displacement data acquired by the different-axis ranging sensors 450 and the displacement data acquired by the co-axis ranging sensor 460 while scanning the to-be-cut line 5 with the laser light L. This causes the condenser lens unit 430 to move in the Z-axis direction based on the displacement data with the distance between the laser light entry surface of the object 1 and the concentration point of the laser light L kept constant.

For example, the controller 500 acquires the error signal as the displacement data from the co-axis ranging sensor 460 while scanning the to-be-cut line 5 with the laser light L, performs the feedback control to keep the error signal thus acquired equal to a target value, and drives the drive mechanism 440 to cause the condenser lens unit 430 to follow the laser light entry surface in the Z direction.

Alternatively, for example, the controller 500 acquires the error signal as the displacement data from the preceding different-axis ranging sensor 450 while scanning the to-be-cut line 5 with the laser light L, performs lookahead control (feedforward control) to keep the error signal thus acquired equal to the target value, and drives the drive mechanism 440 to cause the condenser lens unit 430 to follow the laser light entry surface in the Z direction.

Alternatively, for example, the controller 500 performs feedback control to keep a signal based on both the error signal from the co-axis ranging sensor 460 and the error signal from the different-axis ranging sensor 450 equal to the target value while scanning the to-be-cut line 5 with the laser light L and drives the drive mechanism 440 to cause the condenser lens unit 430 to follow the laser light entry surface in the Z direction.

Alternatively, the controller 500 may perform the following control based on at least one of the displacement data acquired by the different-axis ranging sensor 450 and the displacement data acquired by the co-axis ranging sensor 460. For example, the following motion at a position of the condenser lens unit 430 may be checked using the displacement data acquired by the co-axis ranging sensor 460 while following the laser light entry surface using the displacement data acquired by the preceding different-axis ranging sensor 450. Further, an undulation of at least one of the first rail unit 221, the second rail unit 222, and the movable base 223 (see FIG. 7) may be detected using the displacement data acquired by the co-axis ranging sensor 460 while following the laser light entry surface using the displacement data acquired by the preceding different-axis ranging sensor 450. Further, a height position of the edge of the object 1 is acquired by the preceding different-axis ranging sensor 450, and a height position when the optical axis of the condenser lens unit 430 enters the edge (the optical axis of the co-axis ranging sensor 460 enters the edge) may be corrected based on the height position of the edge thus acquired. Further, while following the laser light entry surface using the displacement data acquired by the preceding different-axis ranging sensor 450, an error in the following motion may be feedback-corrected using the displacement data acquired by the co-axis ranging sensor 460 (feedforward control+feedback control). Further, in order to increase options regarding processing on a special wafer, an optimally suited sensor may be selected from the different-axis ranging sensors 450 and the co-axis ranging sensor 460 based on the type of the object 1 or the like.

[Action and Effect]

As described above, the laser processing device 200 includes, as a sensor that acquires the displacement data on the light entry surface, both the different-axis ranging sensors 450 that makes irradiation with the first ranging laser light L1 different in axis from the laser light L without through the condenser lens unit 430 and the co-axis ranging sensor 460 that makes irradiation with the second ranging laser light L2 coaxial with the laser light L through the condenser lens unit 430. The different-axis ranging sensors 450 and the co-axis ranging sensor 460 have different advantages, and thus the use of the best of both the advantages as needed makes it possible to accurately acquire the displacement data in accordance with various requirements. A more stable and accurate following motion can be made. Furthermore, one of the different-axis ranging sensors 450 is disposed adjacent one side of the plane on which the optical path of the laser light L extends from the reflecting spatial light modulator 410 to the condenser lens unit 430 (plane parallel to the YZ plane). That is, one of the different-axis ranging sensors 450 is efficiently disposed for each component arranged on the optical path of the laser light L extending from the reflecting spatial light modulator 410 to the condenser lens unit 430.

Therefore, the laser processing device 200 is capable of accurately acquiring the displacement data on the laser light entry surface of the object 1 in accordance with various requirements while suppressing an increase in device size. In the laser processing device 200, the different-axis ranging sensors 450 and the co-axis ranging sensor 460 can be installed together, which in turn makes it possible to use the different-axis ranging sensors 450 and the co-axis ranging sensor 460 together to enable a new function that cannot be enabled by one of the sensors alone. Control that combines both the advantages is made available.

The laser processing device 200 includes the housing 401 that supports at least the reflecting spatial light modulator 410, the condenser lens unit 430, the pair of lenses 422, 423, the dichroic mirror 403, and one of the different-axis ranging sensors 450, and the second transfer mechanism 240 that moves the housing 401 in a first direction (Z-axis direction). The condenser lens unit 430 and one of the different-axis ranging sensors 450 are attached to the end 401d of the housing 401 in a second direction (Y-axis direction). The second transfer mechanism 240 is attached to the one side surface 401e of the housing 401 in a third direction (X-axis direction). This allows the reflecting spatial light modulator 410, the condenser lens unit 430, the pair of lenses 422, 423, the dichroic mirror 403, and one of the different-axis ranging sensors 450 to move together while suppressing an increase in device size.

The laser processing device 200 includes the plurality of different-axis ranging sensors 450 of which one different-axis ranging sensor 450 is disposed on one side of the condenser lens unit 430 in the X direction and the other different-axis ranging sensor 450 is disposed on the other side of the condenser lens unit 430 in the X direction. This configuration allows the plurality of different-axis ranging sensors 450 to be efficiently arranged for each component arranged on the optical path of the laser light L extending from the reflecting spatial light modulator 410 to the condenser lens unit 430.

The laser processing device 200 includes the drive mechanism 440 that moves the condenser lens unit 430 along the optical axis, and the controller 500 that controls drive for the drive mechanism 440. The controller 500 drives the drive mechanism 440 to cause the condenser lens unit 430 to follow the laser light entry surface based on at least one of the displacement data acquired by the different-axis ranging sensors 450 and the displacement data acquired by the co-axis ranging sensor 460. This configuration allows the condenser lens unit 430 to move based on the displacement data from at least one of the different-axis ranging sensors 450 and the co-axis ranging sensor 460 with the distance between the laser light entry surface and the concentration point of the laser light L kept constant, for example.

Note that the laser processing device 200 further exhibits the following action and effect.

In the laser processing device 200, a mirror that reflects the laser light L that has passed through the pair of lenses 422, 423 toward the condenser lens unit 430 is the dichroic mirror 403. This allows some of the laser light L that has passed through the dichroic mirror 403 to be used for various applications.

In the laser processing device 200, the dichroic mirror 403 reflects the laser light L as S-polarized light. This allows the scan direction of the laser light L to coincide with the polarization direction of the laser light L when the object 1 is scanned with the laser light L in the third direction (X-axis direction). For example, when the modified region is formed inside the object 1 along the to-be-cut line, making the scan direction of the laser light L coincide with the polarization direction of the laser light L allows the modified region to be formed efficiently.

In the laser processing device 200, the condenser lens unit 430 is attached to the end 401d of the housing 401 in the second direction (Y-axis direction) with the drive mechanism 440 interposed between the condenser lens unit 430 and the end 401d. This allows the condenser lens unit 430 to move with the distance between the laser light entry surface of the object 1 and the concentration point of the laser light L kept constant, for example.

In the laser processing device 200, the reflecting spatial light modulator 410 is attached to the end 401c of the housing 401 in the second direction (Y-axis direction). This allows each component to be efficiently disposed with respect to the housing 401.

The laser processing device 200 includes the device frame 210, the support table 230 that is attached to the device frame 210 and supports the object 1, the laser output unit 300 attached to the device frame 210, and the laser condensing unit 400 attached to the device frame 210 to be movable relative to the laser output unit 300. The laser output unit 300 includes the laser oscillator 310 that emits the laser light L. The laser condensing unit 400 includes the reflecting spatial light modulator 410 that modulates and reflects the laser light L, the condenser lens unit 430 that converges the laser light L at the object 1, and the pair of lenses 422, 423 constituting the both-side telecentric optical system in which the reflecting surface 410a of the reflecting spatial light modulator 410 and the entrance pupil surface 430a of the condenser lens unit 430 have an imaging relation.

In the laser processing device 200, the laser condensing unit 400 including the reflecting spatial light modulator 410, the condenser lens unit 430, and the pair of lenses 422, 423 is movable relative to the laser output unit 300 including the laser oscillator 310. Therefore, as compared to a configuration where all components arranged on the optical path of the laser light L extending from the laser oscillator 310 to the condenser lens unit 430 are moved together, this configuration makes it possible to reduce the weight of the laser condensing unit 400 to be moved and in turn downsize the second transfer mechanism 240 that moves the laser condensing unit 400. In addition, the reflecting spatial light modulator 410, the condenser lens unit 430, and the pair of lenses 422, 423 are moved together to keep their positional relation unchanged, which makes it possible to transfer an image of the laser light L on the reflecting surface 410a of the reflecting spatial light modulator 410 to the entrance pupil surface 430a of the condenser lens unit 430 with high accuracy. Therefore, according to the laser processing device 200, the components on the condenser lens unit 430 side can be moved relative to the object 1 while suppressing an increase in device size.

In the laser processing device 200, the exit direction (Z-axis direction) of the laser light L from the laser output unit 300 coincides with the movement direction (Z-axis direction) of the laser condensing unit 400. This makes it possible to suppress a change in position of the laser light L entering the laser condensing unit 400 even when the laser condensing unit 400 moves relative to the laser output unit 300.

In the laser processing device 200, the laser output unit 300 further includes the beam expander 350 that collimates the laser light L. This makes it possible to suppress a change in diameter of the laser light L entering the laser condensing unit 400 even when the laser condensing unit 400 moves relative to the laser output unit 300. Note that even when the laser light L is not completely collimated by the beam expander 350 and thus has, for example, a slight divergence angle, the laser light L can be collimated by the reflecting spatial light modulator 410.

In the laser processing device 200, the laser condensing unit 400 further includes the housing 401 in which the optical path of the laser light L extending from the reflecting spatial light modulator 410 to the condenser lens unit 430 through the pair of lenses 422, 423 is set, and the light entry port 401a that allows the laser light L emitted from the laser output unit 300 to enter the housing 401 is provided on the housing 401. This allows the laser condensing unit 400 to move relative to the laser output unit 300 while keeping the state of the optical path of the laser light L extending from the reflecting spatial light modulator 410 to the condenser lens unit 430 through the pair of lenses 422, 423 unchanged.

In the laser processing device 200, the laser condensing unit 400 further includes the mirror 402 disposed in the housing 401 to face the light entry port 401a in the movement direction of the laser condensing unit 400 (Z-axis direction), and the mirror 402 reflects the laser light L entering the housing 401 through the light entry port 401a toward the reflecting spatial light modulator 410. This allows the laser light L entering the laser condensing unit 400 from the laser output unit 300 to enter the reflecting spatial light modulator 410 at a desired angle.

In the laser processing device 200, the support table 230 is attached to the device frame 210 to be movable along the plane (XY plane) orthogonal to the movement direction of the laser condensing unit 400 (Z-axis direction). This allows the laser light L to be converged at a desire position on the object 1 and allows the object 1 to be scanned with the laser light L in a direction parallel to a plane orthogonal to the movement direction of the laser condensing unit 400.

In the laser processing device 200, the support table 230 is attached to the device frame 210 with the first transfer mechanism 220 interposed between the support table 230 and the device frame 210, and the laser condensing unit 400 is attached to the device frame 210 with the second transfer mechanism 240 interposed between the laser condensing unit 400 and the device frame 210. This makes it possible to reliably move the support table 230 and the laser condensing unit 400.

The laser processing device 200 includes the device frame 210, the support table 230 that is attached to the device frame 210 and supports the object 1, the laser output unit 300 that is attachable to and detachable from the device frame 210, and the laser condensing unit 400 attached to the device frame 210. The laser output unit 300 includes the laser oscillator 310 that emits the laser light L, and the λ/2 wavelength plate unit 330 and the polarizing plate unit 340 that adjust the output of the laser light L. The laser condensing unit 400 includes the reflecting spatial light modulator 410 that modulates and reflects the laser light L, the condenser lens unit 430 that converges the laser light L at the object 1, and the pair of lenses 422, 423 constituting the both-side telecentric optical system in which the reflecting surface 410a of the reflecting spatial light modulator 410 and the entrance pupil surface 430a of the condenser lens unit 430 have an imaging relation.

In the laser processing device 200, the laser output unit 300 including the laser oscillator 310, and the λ/2 wavelength plate unit 330 and the polarizing plate unit 340 is attachable to and detachable from the device frame 210, separately from the laser condensing unit 400 including the reflecting spatial light modulator 410, the condenser lens unit 430, and the pair of lenses 422, 423. Therefore, when the wavelength of the laser light L suitable for processing varies depending on, for example, specifications and processing conditions of the object 1, the laser oscillator 310 that emits the laser light L having a desired wavelength, and the λ/2 wavelength plate unit 330 and the polarizing plate unit 340 that are dependent on wavelength can be replaced together. Therefore, according to the laser processing device 200, a plurality of the laser oscillators 310 that emit the laser light L different in wavelength from each other may be used.

In the laser processing device 200, the laser output unit 300 further includes the attachment base 301 that supports the laser oscillator 310, and the λ/2 wavelength plate unit 330 and the polarizing plate unit 340 and is attachable to and detachable from the device frame 210, and the laser output unit 300 is attached to the device frame 210 with the attachment base 301 interposed between the laser output unit 300 and the device frame 210. This allows the laser output unit 300 to be easily attached to and detached from the device frame 210.

In the laser processing device 200, the laser output unit 300 further includes the mirrors 362, 363 used for adjusting the optical axis of the laser light L emitted from the laser output unit 300. This makes it possible to adjust the position and angle of the optical axis of the laser light L entering the laser condensing unit 400 when the laser output unit 300 is attached to the device frame 210, for example.

In the laser processing device 200, the λ/2 wavelength plate unit 330 and the polarizing plate unit 340 adjust the polarization direction of the laser light L. This makes it possible to adjust the polarization direction of the laser light L entering the laser condensing unit 400 and in turn adjust the polarization direction of the laser light L exiting from the laser condensing unit 400 when the laser output unit 300 is attached to the device frame 210, for example.

In the laser processing device 200, the λ/2 wavelength plate unit 330 and the polarizing plate unit 340 include the λ/2 wavelength plate 332 and the polarizing plate 342. This allows the λ/2 wavelength plate 332 and the polarizing plate 342 that are dependent on wavelength to be replaced together with the laser oscillator 310.

In the laser processing device 200, the laser output unit 300 further includes the beam expander 350 that collimates the laser light L while adjusting the diameter of the laser light L. This makes it possible to keep the state of the laser light L entering the laser condensing unit 400 unchanged even when the laser condensing unit 400 moves relative to the laser output unit 300, for example.

In the laser processing device 200, the reflecting spatial light modulator 410, the condenser lens unit 430, and the pair of lenses 422, 423 are compatible with the wavelength bands from 500 to 550 nm, 1000 to 1150 nm, and 1300 to 1400 nm. This makes it possible to attach the laser output unit 300 that emits the laser light L in each wavelength band to the laser processing device 200. Note that the laser light L in the wavelength band from 500 to 550 nm is suitable for internal absorption laser processing on a substrate made of, for example, sapphire. The laser light L in the wavelength band from 1000 to 1150 nm and the laser light L in the wavelength band from 1300 to 1400 nm are suitable for internal absorption laser processing on a substrate made of, for example, silicon.

The laser processing device 200 further includes the support table 230 that supports the object 1, the laser oscillator 310 that emits the laser light L, the reflecting spatial light modulator 410 that modulates and reflects the laser light L, the condenser lens unit 430 that converges the laser light L at the object 1, and the pair of lenses 422, 423 constituting the both-side telecentric optical system in which the reflecting surface 410a of the reflecting spatial light modulator 410 and the entrance pupil surface 430a of the condenser lens unit 430 have an imaging relation. Of the optical paths of the laser light L from the reflecting spatial light modulator 410 to the condenser lens unit 430, the optical path of the laser light L passing through at least the pair of lenses 422, 423 (that is, from the lens 422 adjacent to the reflecting spatial light modulator 410 to the lens 423 adjacent to the condenser lens unit 430) linearly extends. The magnification M of the both-side telecentric optical system satisfies 0.5<M<1 or 1<M<2. Note that, in the laser processing device 200, the magnification M of the both-side telecentric optical system, the first focal length f1 of the lens 422, and the second focal length f2 of the lens 423 satisfy M=f2/f1.

In the laser processing device 200, the magnification M of the both-side telecentric optical system is not equal to 1. Accordingly, when the pair of lenses 422, 423 move along the optical axis, the conjugate point adjacent to the condenser lens unit 430 moves. Specifically, in a case of the magnification M<1 (reduction system), when the pair of lenses 422, 423 move along the optical axis toward the condenser lens unit 430, the conjugate point adjacent to the condenser lens unit 430 moves away from the reflecting spatial light modulator 410. On the other hand, in a case of the magnification M>1 (enlargement system), when the pair of lenses 422, 423 move along the optical axis toward the reflecting spatial light modulator 410, the conjugate point adjacent to the condenser lens unit 430 moves away from the reflecting spatial light modulator 410. Thus, for example, when the attachment position of the condenser lens unit 430 is misaligned, the conjugate point adjacent to the condenser lens unit 430 can be aligned with the entrance pupil surface 430a of the condenser lens unit 430. In addition, since the optical path of the laser light L from at least the lens 422 adjacent to the reflecting spatial light modulator 410 to the lens 423 adjacent to the condenser lens unit 430 extends linearly, the pair of lenses 422, 423 can be easily moved along the optical axis. Therefore, according to the laser processing device 200, the image of the laser light L on the reflecting surface 410a of the reflecting spatial light modulator 410 can be easily and accurately transferred to the entrance pupil surface 430a of the condenser lens unit 430.

Note that, satisfying 0.5<M<1 makes it possible to increase the effective aperture of the laser light L on the reflecting surface 410a of the reflecting spatial light modulator 410, which in turn makes it possible to modulate the laser light L with a high-definition phase pattern. On the other hand, satisfying 1<M<2 makes it possible to reduce the effective aperture of the laser light L on the reflecting surface 410a of the reflecting spatial light modulator 410, which in turn makes it possible to reduce the angle α formed by the optical axis of the laser light L entering the reflecting spatial light modulator 410 and the optical axis of the laser light L exiting from the reflecting spatial light modulator 410. Suppressing the entry angle and the reflection angle of the laser light L with respect to the reflecting spatial light modulator 410 is important for suppressing a decrease in diffraction efficiency and fully exhibiting the performance of the reflecting spatial light modulator 410.

In the laser processing device 200, the magnification M may satisfy 0.6≤M≤0.95. This makes it possible to more reliably suppress an increase in length of the optical path of the laser light L extending from the reflecting spatial light modulator 410 to the condenser lens unit 430 while maintaining the effect exhibited when 0.5<M<1 described above is satisfied.

In the laser processing device 200, the magnification M may satisfy 1.05≤M≤1.7. This makes it possible to more reliably suppress an increase in length of the optical path of the laser light L extending from the reflecting spatial light modulator 410 to the condenser lens unit 430 while maintaining the effect exhibited when 1<M<2 described above is satisfied.

In the laser processing device 200, the pair of lenses 422, 423 are held by the holder 421, and the holder 421 keeps the positional relation between the pair of lenses 422, 423 in the direction along the optical axis of the laser light L unchanged, which causes the adjustment to the position of the pair of lenses 422, 423 in the direction along the optical axis of the laser light L (Y-axis direction) to be made by the adjustment to the position of the holder 421. This makes it possible to easily and reliably adjust the position of the pair of lenses 422, 423 (that is, adjust the positions of the conjugate points) with the positional relation between the pair of lenses 422, 423 kept unchanged.

The laser processing device 200 further includes the support table 230 that supports the object 1, the laser oscillator 310 that emits the laser light L, the reflecting spatial light modulator 410 that modulates and reflects the laser light L, the condenser lens unit 430 that coverges the laser light L at the object 1, the pair of lenses 422, 423 constituting the both-side telecentric optical system in which the reflecting surface 410a of the reflecting spatial light modulator 410 and the entrance pupil surface 430a of the condenser lens unit 430 have an imaging relation, and the dichroic mirror 403 that reflects the laser light L that has passed through the pair of lenses 422, 423 toward the condenser lens unit 430. The reflecting spatial light modulator 410 reflects the laser light L at an acute angle along a predetermined plane (a plane including the optical path of the laser light L entering and exiting from the reflecting spatial light modulator 410, a plane parallel to the XY plane). The optical path of the laser light L extending from the reflecting spatial light modulator 410 to the dichroic mirror 403 through the pair of lenses 422, 423 is set along the plane. The optical path of the laser light L extending from the dichroic mirror 403 to the condenser lens unit 430 is set along a direction intersecting the plane (Z-axis direction).

In the laser processing device 200, the optical path of the laser light L extending from the reflecting spatial light modulator 410 to the dichroic mirror 403 through the pair of lenses 422, 423 is set along the predetermined plane, and the optical path of the laser light L extending from the dichroic mirror 403 to the condenser lens unit 430 is set along a direction intersecting the plane. This allows the laser light L to be reflected off the reflecting spatial light modulator 410 as P-polarized light and to be reflected off the mirror as S-polarized light, for example. This is important for accurately transferring the image of the laser light L on the reflecting surface 410a of the reflecting spatial light modulator 410 to the entrance pupil surface 430a of the condenser lens unit 430. Further, the reflecting spatial light modulator 410 reflects the laser light L at an acute angle. Suppressing the entry angle and the reflection angle of the laser light L with respect to the reflecting spatial light modulator 410 is important for suppressing a decrease in diffraction efficiency and fully exhibiting the performance of the reflecting spatial light modulator 410. Thus, according to the laser processing device 200, the image of the laser light L on the reflecting surface 410a of the reflecting spatial light modulator 410 can be easily and accurately transferred to the entrance pupil surface 430a of the condenser lens unit 430.

In the laser processing device 200, the optical path of the laser light L extending from the dichroic mirror 403 to the condenser lens unit 430 is set along the direction orthogonal to the above-described plane (plane parallel to the XY plane), and the dichroic mirror 403 reflects the laser light L at a right angle. This makes it possible to route the optical path of the laser light L extending from the reflecting spatial light modulator 410 to the condenser lens unit 430 at a right angle.

In the laser processing device 200, a mirror that reflects the laser light L that has passed through the pair of lenses 422, 423 toward the condenser lens unit 430 is the dichroic mirror 403. This allows some of the laser light L that has passed through the dichroic mirror 403 to be used for various applications.

In the laser processing device 200, the reflecting spatial light modulator 410 reflects the laser light L as P-polarized light, and the dichroic mirror 403 reflects the laser light L as S-polarized light. This allows the image of the laser light L on the reflecting surface 410a of the reflecting spatial light modulator 410 to be accurately transferred to the entrance pupil surface 430a of the condenser lens unit 430.

The laser processing device 200 further includes the $\lambda/2$ wavelength plate unit 330 and the polarizing plate unit 340 that are arranged on the optical path of the laser light L extending from the laser oscillator 310 to the reflecting spatial light modulator 410 and adjust the polarization direction of the laser light L. This makes it possible to adjust the polarization direction of the laser light L in preparation for reflection of the laser light L off the reflecting spatial light modulator 410 at an acute angle, which in turn makes it possible to route the optical path of the laser light L extending from the laser oscillator 310 to the reflecting spatial light modulator 410 at right angles.

Further, the laser output unit 300 includes the laser oscillator 310 that emits the laser light L, the $\lambda/2$ wavelength plate unit 330 and the polarizing plate unit 340 that adjust the output of the laser light L emitted from the laser oscillator 310, the mirror unit 360 that causes the laser light L that has passed through the $\lambda/2$ wavelength plate unit 330 and the polarizing plate unit 340 to exit to the outside, and the attachment base 301 having the main surface 301a on which the laser oscillator 310, the $\lambda/2$ wavelength plate unit 330 and the polarizing plate unit 340, and the mirror unit 360 are arranged. The optical path of the laser light L extending from the laser oscillator 310 to the mirror unit 360 through the $\lambda/2$ wavelength plate unit 330 and the polarizing plate unit 340 is set along the plane parallel to the main surface 301a. The mirror unit 360 includes the mirrors 362, 363 used for adjusting the optical axis of the laser light L, and causes the laser light L to exit to the outside in the direction intersecting the plane (Z-axis direction).

In the laser output unit 300, the laser oscillator 310, the $\lambda/2$ wavelength plate unit 330 and the polarizing plate unit 340, and the mirror unit 360 are arranged on the main surface 301a of the attachment base 301. This allows the laser output unit 300 to be easily attached to and detached from the laser processing device 200 by attachment and detachment of the attachment base 301 to and from the device frame 210 of the laser processing device 200. Further, the optical path of the laser light L extending from the laser oscillator 310 to the mirror unit 360 through the $\lambda/2$ wavelength plate unit 330 and the polarizing plate unit 340 is set along the plane parallel to the main surface 301a of the attachment base 301, and the mirror unit 360 causes the laser light L to exit to the outside along the direction intersecting the plane. Thus, for example, when the exit direction of the laser light L is along the vertical direction, the laser output unit 300 is reduced in height, so that the laser output unit 300 can be easily attached to and detached from the laser processing device 200. Further, the mirror unit 360 includes the mirrors 362, 363 used for adjusting the optical axis of the laser light L. This makes it possible to adjust the position and angle of the optical axis of the laser light L entering the laser condensing unit 400 when the laser output unit 300 is attached to the device frame 210 of the laser processing device 200. Thus, the laser output unit 300 can be easily attached to and detached from the laser processing device 200.

In laser output unit 300, the mirror unit 360 causes the laser light L to exit to the outside in a direction orthogonal to the plane parallel to the main surface 301*a*. This allows the mirror unit 360 to easily adjust the optical axis of the laser light L.

In the laser output unit 300, the λ/2 wavelength plate unit 330 and the polarizing plate unit 340 adjust the polarization direction of the laser light L emitted from the laser oscillator 310. This makes it possible to adjust the polarization direction of the laser light L entering the laser condensing unit 400 and in turn adjust the polarization direction of the laser light L exiting from the laser condensing unit 400 when the laser output unit 300 is attached to the device frame 210 of the laser processing device 200.

In the laser output unit 300, the λ/2 wavelength plate unit 330 and the polarizing plate unit 340 include the λ/2 wavelength plate 332 where the laser light L emitted from the laser oscillator 310 enters along the axis XL (axis parallel to the main surface 301*a*), the holder 331 that holds the λ/2 wavelength plate 332 to make the λ/2 wavelength plate 332 rotatable about the axis XL, the polarizing plate 342 where the laser light L that has passed through the λ/2 wavelength plate 332 enters along the axis XL, and the holder 341 that holds the polarizing plate 342 to make the polarizing plate 342 rotatable about the axis XL. This makes it possible to adjust the output and polarization direction of the laser light L emitted from the laser oscillator 310 with a simple configuration. Further, since the laser output unit 300 includes such λ/2 wavelength plate unit 330 and polarizing plate unit 340, a λ/2 wavelength plate 332 and polarizing plate 342 that are compatible with the wavelength of the laser light L emitted from the laser oscillator 310 can be used.

The laser output unit 300 further includes the optical path correcting plate 343 that is held by the holder 341 to be rotatable together with the polarizing plate 342 about the axis XL and returns, to the axis XL, the optical axis of the laser light L that is misaligned from the axis XL after passing through the polarizing plate 342. This makes it possible to eliminate the misalignment of the optical path of the laser light L by causing the laser light L to pass through the polarizing plate 342.

In the laser output unit 300, an axis about which the λ/2 wavelength plate 332 rotates and an axis about which the polarizing plate 342 rotates correspond to the axis XL and thus coincide with each other. That is, the λ/2 wavelength plate 332 and the polarizing plate 342 are rotatable about the same axis XL. This makes it possible to simplify and downsize the laser output unit 300.

In the laser output unit 300, the mirror unit 360 includes the support base 361 and the mirrors 362, 363, the support base 361 is attached to the attachment base 301 to be adjustable in position, the mirror 362 is attached to the support base 361 to be adjustable in angle and reflects the laser light L that has passed through the λ/2 wavelength plate unit 330 and the polarizing plate unit 340 in the direction parallel to the main surface 301*a*, and the mirror 363 is attached to the support base 361 to be adjustable in angle and reflects, in the direction intersecting the main surface 301*a*, the laser light L reflected off the mirror 362. This makes it possible to more accurately adjust the position and angle of the optical axis of the laser light L entering the laser condensing unit 400 when the laser output unit 300 is attached to the device frame 210 of the laser processing device 200. In addition, an adjustment to the position of the support base 361 relative to the attachment base 301 makes it possible to easily adjust the positions of the mirrors 362, 363 together.

The laser output unit 300 further includes the beam expander 350 that is disposed on the optical path of the laser light L extending from the λ/2 wavelength plate unit 330 and the polarizing plate unit 340 to the mirror unit 360 and collimates the laser light L while adjusting the diameter of the laser light L. This makes it possible to keep the state of the laser light L entering the laser condensing unit 400 unchanged even when the laser condensing unit 400 moves relative to the laser output unit 300.

The laser output unit 300 further includes the shutter 320 that is disposed on the optical path of the laser light L extending from the laser oscillator 310 to the λ/2 wavelength plate unit 330 and the polarizing plate unit 340 and opens and closes the optical path of the laser light L. This allows the switching of the output of the laser light L from the laser output unit 300 between ON and OFF to be made by the switching of the output of the laser light L in the laser oscillator 310 between ON and OFF. In addition, the shutter 320 can prevent the laser light L from being unintentionally emitted from the laser output unit 300, for example.

[Modification]

Although the description has been given above of the embodiment, one aspect of the present invention is not limited to the embodiment described above.

A polarizing member other than the polarizing plate 342 may be provided in the polarizing plate unit 340. As an example, instead of the polarizing plate 342 and the optical path correcting plate 343, a cube-shaped polarizing member may be used. The cube-shaped polarizing member is a member having a rectangular parallelepiped shape, the opposite side surfaces of the member serve as a light entry surface and a light exit surface, and a layer provided between the side surfaces functions as a polarizing plate.

The axis about which the λ/2 wavelength plate 332 rotates and the axis about which the polarizing plate 342 rotates need not coincide with each other. Although the above-described embodiment includes the reflecting spatial light modulator 410, the present invention is not limited to such a reflecting spatial light modulator and may include a transmitting spatial light modulator.

The laser output unit 300 includes the mirrors 362, 363 used for adjusting the optical axis of the laser light L emitted from the laser output unit 300, but only needs to include at least one mirror used for adjusting the optical axis of the laser light L emitted from the laser output unit 300.

The imaging optical system constituting the both-side telecentric optical system in which the reflecting surface 410*a* of the reflecting spatial light modulator 410 and the entrance pupil surface 430*a* of the condenser lens unit 430 have an imaging relation is not limited to the pair of lenses 422, 423 and may include, for example, a first lens system (for example, a cemented lens, or three or more lenses) adjacent to the reflecting spatial light modulator 410, and a second lens system (for example, a cemented lens, or three or more lenses) adjacent to the condenser lens unit 430.

In the laser condensing unit 400, the mirror that reflects the laser light L that has passed through the pair of lenses 422, 423 toward the condenser lens unit 430 is the dichroic mirror 403, but the mirror may be a total reflection mirror.

The condenser lens unit 430 and the pair of different-axis ranging sensors 450 are attached to the end 401d of the housing 401 in the Y-axis direction, but only need to be attached to any position closer to the end 401d than the center of the housing 401 in the Y-axis direction. The reflecting spatial light modulator 410 is attached to the end 401c of the housing 401 in the Y-axis direction, but only needs to be attached to any position closer to the end 401c than the center of the housing 401 in the Y-axis direction. Further, the different-axis ranging sensors 450 may be disposed on only one side of the condenser lens unit 430 in the X-axis direction.

The laser condensing unit 400 may be fixed to the device frame 210. In this case, the support table 230 may be attached to the device frame 210 to be movable not only in the X-axis direction and the Y-axis direction but also in the Z-axis direction.

The laser processing device according to one aspect of the present invention is not limited to a device that forms the modified region inside the object 1, and may be a device capable of performing different laser processing such as ablation.

REFERENCE SIGNS LIST

1 Object to be processed
200 Laser processing device
230 Support table (support unit)
240 Second transfer mechanism (transfer mechanism)
310 Laser oscillator (laser light source)
401 Housing
401c End
401d End
401e Side surface
403 Dichroic mirror (mirror)
410 Reflecting spatial light modulator (spatial light modulator)
410a Reflecting surface
421 Holder
422 Lens (imaging optical system)
423 Lens (imaging optical system)
430 Condenser lens unit (light collection optical system)
440 Drive mechanism
450 Different-axis ranging sensor (first sensor)
460 Co-axis ranging sensor (second sensor)
500 Controller
L Laser light
L1 First ranging laser light
L1R Reflected light
L2 Second ranging laser light
L2R Reflected light

The invention claimed is:

1. A laser processing device comprising:
a support unit configured to support an object to be processed;
a laser light source configured to emit laser light;
a reflecting spatial light modulator configured to modulate and reflect the laser light;
a light collection optical system configured to converge the laser light at the object;
an imaging optical system constituting a both-side telecentric optical system in which a reflecting surface of the reflecting spatial light modulator and an entrance pupil surface of the light collection optical system have an imaging relation;
a mirror configured to reflect, toward the light collection optical system, the laser light passing through the imaging optical system;
a first sensor configured to irradiate the object with first ranging laser light different in axis from the laser light without through the light collection optical system and receive reflected light of the first ranging laser light to acquire displacement data on a laser light entry surface of the object; and
a second sensor configured to irradiate the object with second ranging laser light coaxial with the laser light through the light collection optical system and receive reflected light of the second ranging laser light to acquire displacement data on the laser light entry surface, wherein
an optical path of the laser light extending from the mirror to the light collection optical system is set along a first direction,
an optical path of the laser light extending from the reflecting spatial light modulator to the mirror through the imaging optical system is set along a second direction orthogonal to the first direction, and
the first sensor is disposed on one side of the light collection optical system in a third direction orthogonal to the first direction and the second direction.

2. The laser processing device according to claim 1, further comprising:
a housing configured to support at least the reflecting spatial light modulator, the light collection optical system, the imaging optical system, the mirror, and the first sensor; and
a transfer mechanism configured to move the housing in the first direction, wherein
the light collection optical system and the first sensor are attached to one end of the housing in the second direction, and
the transfer mechanism is attached to one side surface of the housing in the third direction.

3. The laser processing device according to claim 1, wherein
a plurality of the first sensors are provided,
one of the plurality of first sensors is disposed on the one side of the light collection optical system in the third direction, and
another of the plurality of first sensors is disposed on another side of the light collection optical system in the third direction.

4. The laser processing device according to claim 1, further comprising:
a drive mechanism configured to move the light collection optical system along an optical axis; and
a controller configured to control drive for the drive mechanism, wherein
the controller drives the drive mechanism based on at least any one of the displacement data acquired by the first sensor and the displacement data acquired by the second sensor to cause the light collection optical system to follow the laser light entry surface.

5. The laser processing device according to claim 2, wherein
a plurality of the first sensors are provided,
one of the plurality of first sensors is disposed on the one side of the light collection optical system in the third direction, and
another of the plurality of first sensors is disposed on another side of the light collection optical system in the third direction.

6. The laser processing device according to claim 2, further comprising:
- a drive mechanism configured to move the light collection optical system along an optical axis; and
- a controller configured to control drive for the drive mechanism, wherein
- the controller drives the drive mechanism based on at least any one of the displacement data acquired by the first sensor and the displacement data acquired by the second sensor to cause the light collection optical system to follow the laser light entry surface.

7. The laser processing device according to claim 3, further comprising:
- a drive mechanism configured to move the light collection optical system along an optical axis; and
- a controller configured to control drive for the drive mechanism, wherein
- the controller drives the drive mechanism based on at least any one of the displacement data acquired by the first sensor and the displacement data acquired by the second sensor to cause the light collection optical system to follow the laser light entry surface.

\* \* \* \* \*